United States Patent
Fernandes et al.

(10) Patent No.: US 8,677,230 B2
(45) Date of Patent: Mar. 18, 2014

(54) NETWORK-BASED DATA CONSOLIDATION, CALCULATION AND REPORTING ENGINE

(75) Inventors: Milliken Fernandes, Forest Hills, NY (US); Robert I. Lee, Jr., Franklin Lakes, NJ (US); Dragan Masnikosa, Woodside, NY (US); Supriya Samanta, Mamaroneck, NY (US)

(73) Assignee: Morgan Stanley, New York, NY (US)

( * ) Notice: Subject to any disclaimer, the term of this patent is extended or adjusted under 35 U.S.C. 154(b) by 210 days.

(21) Appl. No.: 13/233,059

(22) Filed: Sep. 15, 2011

(65) Prior Publication Data

US 2013/0073937 A1 Mar. 21, 2013

(51) Int. Cl.
*G06F 17/00* (2006.01)
(52) U.S. Cl.
USPC .......... 715/212; 715/219; 715/227; 715/234; 705/313; 705/314; 705/315
(58) Field of Classification Search
USPC .......... 715/212, 219, 220, 227, 234; 705/313, 705/314, 15, 315
See application file for complete search history.

(56) References Cited

U.S. PATENT DOCUMENTS

| | | | |
|---|---|---|---|
| 7,539,944 B2 | 5/2009 | Gauthier et al. | |
| 7,720,867 B2 * | 5/2010 | Subramanian et al. | 707/793 |
| 8,082,489 B2 * | 12/2011 | Jiang | 715/212 |
| 8,214,244 B2 * | 7/2012 | Haynes et al. | 705/7.25 |
| 8,306,842 B2 * | 11/2012 | Rahi et al. | 705/7.23 |
| 2004/0039990 A1 * | 2/2004 | Bakar et al. | 715/505 |
| 2004/0098732 A1 * | 5/2004 | Clement et al. | 719/328 |
| 2004/0111666 A1 * | 6/2004 | Hollcraft | 715/503 |
| 2006/0053383 A1 | 3/2006 | Gauthier et al. | |
| 2007/0011177 A1 | 1/2007 | Sol et al. | |
| 2007/0074120 A1 | 3/2007 | Lindhorst et al. | |
| 2007/0094060 A1 | 4/2007 | Apps et al. | |
| 2007/0233811 A1 | 10/2007 | Rochelle et al. | |
| 2008/0319811 A1 * | 12/2008 | Casey | 705/7 |
| 2010/0211862 A1 | 8/2010 | Parish et al. | |
| 2012/0054590 A1 | 3/2012 | Oh | |
| 2012/0211862 A1 | 8/2012 | Nagai et al. | |

* cited by examiner

*Primary Examiner* — Stephen Hong
*Assistant Examiner* — Matthew Ludwig
(74) *Attorney, Agent, or Firm* — Weitzman Law Offices, LLC

(57) ABSTRACT

Methods and computerized apparatus for shared business modeling involving multiple spreadsheet-based business models in a network of computers, report generation involving consolidation from at least two different spreadsheet-based business models as well as report generation involving multiple different spreadsheet-based business models are described.

19 Claims, 19 Drawing Sheets

NETWORK-BASED DATA CONSOLIDATION, CALCULATION AND REPORTING ENGINE

BACKGROUND

Business users today often do their investment business plan modeling using computer spreadsheets, for example, Excel® workbooks, that allow for both hard data numbers to be contained within the cells of the spreadsheet and calculated values, derived from data in other cells, sheets, workbooks, files or locations, to be contained within other cells of the spreadsheet.

In the case of business models relating to complex assets, for example, real estate investments, such models can become highly complex. Moreover, since such investments are often independent of each other both in the sense that the performance of one may be wholly unrelated to the performance of another and further disassociated in the sense that they may be diverse in location and/or type. For example, such investments might be in real estate in different cities, states or countries and/or different types of real-estate, such as single family homes, apartment buildings, commercial office space, shopping centers, malls, parking lots or garages, factory space, etc.

For businesses that hold many such diverse assets, a model might be created for each such asset at different times, for example, prior to acquisition to determine whether to acquire the asset, or upon/after acquisition. In addition, for some assets, some prior data may be available that will allow the business to perform projections under different scenarios relating to that asset. In either case, the analysis will often involve deriving new models for new or prospective assets from existing models for similar or related assets. Users often use spreadsheets for their business models specifically because of the flexibility they provide in this regard. Moreover, it is much more efficient for a user to adapt a preexisting spreadsheet-based model that has been "fine-tuned" over time and based upon experience unique to that asset situation, rather than creating a new one for each new asset.

At times it may further be desirable to perform some analysis using such models, for example, to determine absolute or relative performance, consider "what if" scenarios, or perform tax, profitability or other accounting calculations on some period basis. While this can be done within a single spreadsheet model, this cannot easily be done across multiple often unique spreadsheet models that collectively model a portfolio of assets. Since spreadsheet models for different assets may be non-standardized (and even non standardizeable) and are often created by different people in different formats/styles or customized for specific assets, it may be difficult, if not impossible, to perform multi-asset analysis without individually (and possibly iteratively) manually going into each model, making changes, seeing the result and potentially using that result to make further adjustments in other models, particularly for highly complex models that may extensively rely upon spreadsheet provided features.

Thus, in order to be able to perform multi-asset analysis, some institutions may require asset modeling to be performed using custom modeling tool systems and interfaces that may mimic some aspects of a spreadsheet workbook to some degree and imposes standardization among the different asset models so that they can be collectively analyzed. In other words, they act like a template to which the user must conform.

This approach is inefficient for several reasons. First, it can entail redundancy in user work in terms of transposing aspects of each model into the modeling tool system. Second, this approach subjects them to the inconvenience of maintaining data at multiple places because, when data in a model changes, that change must now be reflected in the data of the modeling tool system. Third, since such modeling tools are not full spreadsheets they lack some of the spreadsheet functions and capabilities. Even if such modeling tools include processing behind their interface that attempts to replicate spreadsheet functions and capabilities, much is lost because spreadsheets provide an array of features and functionality which are nearly impossible to duplicate in a complicated modeling tool. Finally, the template approach generally precludes users from adding or augmenting what the template can do, leaving them with little to no flexibility for unique or non-standard types of data input or manipulations.

Still further, even if the particular modeling tool enables a user to somehow upload or import data from their models into the modeling tool, because the models can be large and complex, the upload process might take a long time and prevent a user from concurrently using that computer.

SUMMARY

One aspect of our approach involves a method of shared business modeling involving spreadsheet-based business models in a network of computers. The method includes: maintaining a set of tags in at least one storage device in the network, at least some of the tags in the set comprising metric dimension tags and others of the tags in the set comprising entity dimension tags, the metric dimension tags and entity dimension tags being assignable by a user to entries in a user's spreadsheet to create rules associating cells of the spreadsheet each with at least one metric dimension tag and one entity dimension tag; receiving a specific association of a particular spreadsheet with an entity within the network having an entity identifier, the particular spreadsheet including at least one rule comprising at least one uniquely named table associating data values from specific cells within the particular spreadsheet such that the specific cells will each be tagged with at least both a specific entity dimension tag and a specific metric dimension tag; extracting, using a computer in the network, spreadsheet data values from the tagged cells and their associated metric dimension tags and entity dimension tags from the spreadsheet; and storing each of the spreadsheet data values in combination with their respective metric dimension tag and entity dimension tag, in the shared network-accessible storage.

Another aspect of our approach involves a method of converting a local business model in a spreadsheet into a network-based business model. The method involves: opening the spreadsheet on a computer of a network; associating the spreadsheet with an entity on the network, the entity having an entity identifier that can be used to tag at least one cell of a spreadsheet to that entity; creating a rule for at least one cell of the spreadsheet, the rule comprising an association of tags for at least two dimensions with contents of the cell; mapping the spreadsheet onto the network; and initiating a workflow operation for the spreadsheet which will cause a computer on the network to extract and save information from the spreadsheet on shared network storage based upon dimension tags within the spreadsheet such that, (a) if the contents of the cell is a number, the number and the at least two dimensions associated with the cell will be stored on the shared network storage, and (b) if the contents of the cell is an expression, a result of evaluating the expression, will be stored on the shared network storage along with the at least two dimensions associated with the cell.

Yet another aspect of our approach involves a computer apparatus. The apparatus includes computer network shared data storage, multiple computers coupled to the computer network shared data storage, a spreadsheet application on at least one of the multiple computers, through which a user can implement a business data model and maintain the business data model in the computer network shared data storage. The apparatus further includes a computer-based tagging engine which provides a user accessible interface through which a user establishes rules for data of the business data model by associating at least one cell of a spreadsheet implementing the business data model with at least both an entity dimension tag and a metric dimension tag, a computer based sync engine which ensures that data contents of the business data model stored in the computer network shared data storage reflect a current value for the at least one cell; and a computer based calc engine which can receive output from the tagging engine and performs period aggregation and entity aggregation for the data model before storing data of the business data model in the computer network shared data storage.

A further aspect of our approach involves a computerized method of report generation involving at least two spreadsheet-based business models. The method involves: receiving a selection, via a computer interface, of a first asset having a first system comprehensible spreadsheet-based business model associated therewith and a second asset having a second system comprehensible spreadsheet-based business model associated therewith for inclusion in a scenario; receiving a selection, at a server, of at least one assumption to be applied to the scenario; initiating a calc workflow operation, the calc workflow operation including accessing tagged data from storage accessible by the server, applying the at least one assumption to at least one item of tagged data; and generating a report using the tagged data incorporating application of the at least one assumption.

Some embodiments of the above are intended to provide users with the ability of retaining their existing individual spreadsheet-based business model files created using, for example, Excel, Quattro Pro, Lotus Symphony or 123, OpenOffice calc, LibreOffice calc, GoogleDocs, NeoOffice, StarOffice or some other spreadsheet program, while using an interface, for example as described herein, to tag data from those files such that this data can be exported in a way that allows it to be understood, and thereby used, for performing various system-level calculations, manipulations and aggregation and/or for generating reports based upon information from at least two such models. The exported tagged and calculated data can further be maintained in a network-based data store, for example a database, so that it can be made available for other analysis and can be automatically updated to reflect subsequent user changes without the need to re-enter the data.

Advantageously, the approach described herein is minimally invasive with reference to the user's business data model (i.e. spreadsheet file(s)) because the user flexibly controls the amount and extent of the invasion through the tagging process and the user does not need to manually change any other data elsewhere in the system when they change some item of tagged data in their model.

Apart from the model creation process, this approach additionally, and advantageously can allow users to be provided with a navigable list of existing models on, for example, a per entity or per reporting period basis.

Depending upon the particular embodiment, the existing models can also be used to perform "what if" calculations without the need to worry about affecting the existing model.

Further embodiments can provide an interface to users that allows them to monitor existing models because the network, instead of an individual user, hosts the entire reporting framework. Users can thus, view individual business plan reports on a per entity basis, summary and roll-up reports for multiple entities, etc. grouped together, or analyze relevant reporting data, subject to entering the appropriate parameters.

The foregoing has outlined rather generally the features and some technical advantages of one or more embodiments of this disclosure in order that the following detailed description may be better understood. Additional features and advantages of this disclosure will be described hereinafter, which may form the subject of the claims of this application.

DETAILED DESCRIPTION

Various example embodiments have been described in detail below with reference to the accompanying drawings which form a part thereof. It should be understood that these embodiments are intended as examples for purposes of explanation and, in different cases, may be implemented in different forms.

In summary overview, our approach is designed to work with user created business models created in a conventional manner using a spreadsheet program, as well as to enable creation of new business models based upon some prior example or to modify an existing model to test out various "what if" scenarios. By maintaining data tagged as described herein in network storage, that data can be used to easily populate the new business models, generate reports and perform other operations or analysis and have changes to the data propagate throughout all other relevant business models.

Moreover, implementations of the sync process of our approach advantageously allow for data consistency to automatically be maintained without the need for a user-directed check in/check out scheme.

In addition, users might only care about analyzing existing data in a model or across multiple models without necessarily making any changes to any individual model. Advantageously, we can provide a reporting framework which renders the requested data in reporting format allowing the users to study and analyze the same. Similarly, our reporting framework can allow users to generate reports based upon multiple models without any knowledge of the underlying models themselves.

In another example, a spreadsheet, for example an Excel® workbook, can contain static data pertaining to a model mapped by the user. With our approach, changes made to this spreadsheet file are picked up by the system on a user initiated save request and pushed to the network data store behind the scenes without involving any further user interaction. Conversely, if there is any change to data on a server side, for example, a currency exchange rate change that should be reflected in a report based upon the business model, the system can automatically take that information, push it back to the spreadsheet-based business model to recalculate values dependent upon it and incorporated the results in a report generated from that spreadsheet-based business model data.

Figure 1:
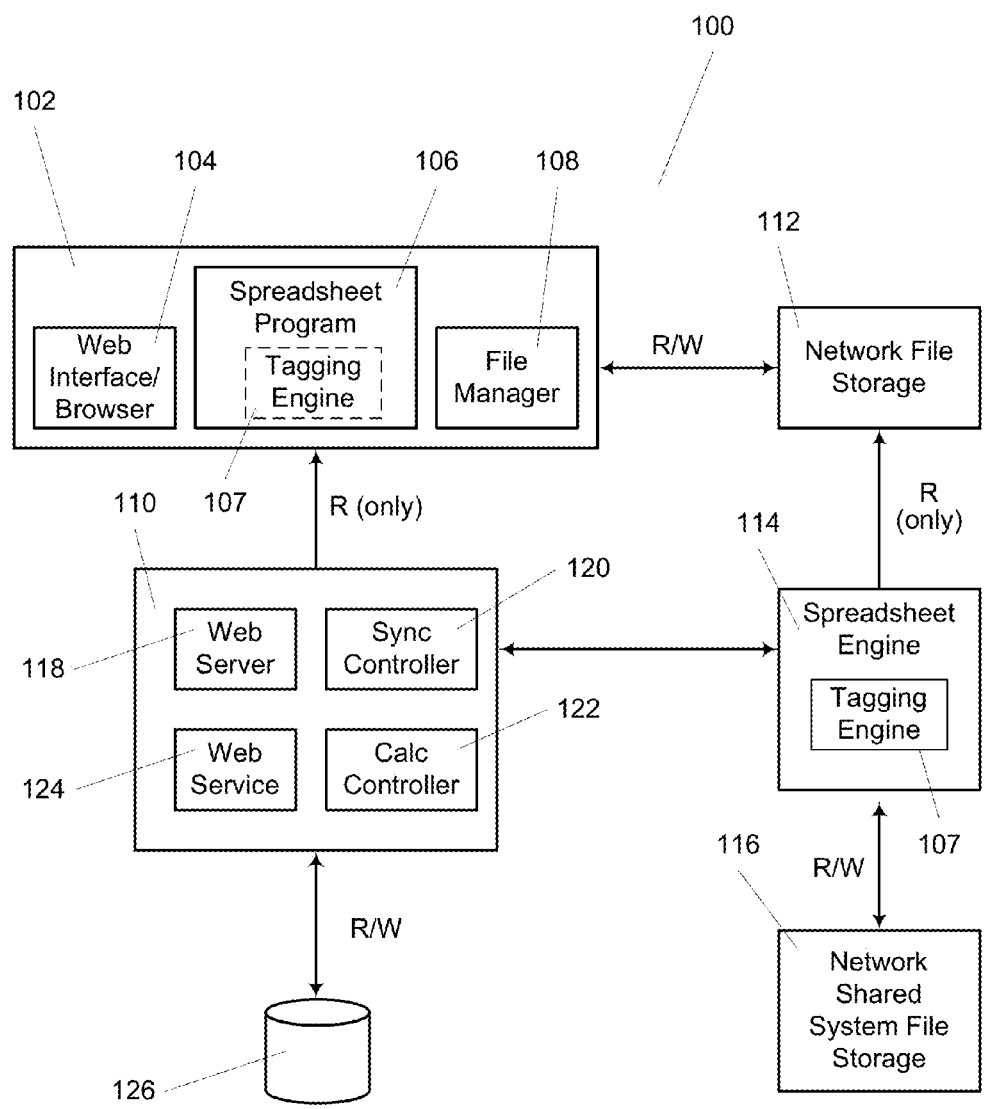
FIG. 1 illustrates, in simplified overview, a high-level conceptual diagrammatic depiction of an example system embodying our approach.

FIG. 1 illustrates, in simplified overview, a high-level conceptual diagrammatic depiction of an example system embodying our approach. The system 100 of FIG. 1 is conceptual in that it may be made up of two or more networked computers and storage. Implementations can use individual computers or can span multiple computers and regions.

In operational overview, a user operating a computer 102 configured with, for example, a web interface or browser 104, a spreadsheet program 106 and a file manager 108, initiates an action using the computer 102 either by requesting data that resides on a server 110 or by initiating a data push to the server 110. For example, the user may use the web interface 104 to request investment-related data in the form of reports to analyze the performance of various entities (which may, in different variants, include assets like, by way of non-limiting examples, real estate, commercial properties, equities, bonds, currencies, or funds/baskets of such assets) in different reporting periods. The spreadsheet program 106 includes a plug-in adjunct that is used to "tag" entries in a spreadsheet-based business model. The plug-in is made up of a user interface (which will be described in greater detail below) and a tagging engine 107 from which tags can be selected and applied to spreadsheet cells as described herein. The tagging engine 107 is the core framework for the tagging operation and is used by the user interface to manipulate the spreadsheet-based models, create tables, set tags for the various dimensions, inject values for certain tags and to extract the tagged values. The user interface provides for user-friendly access to the tagging engine.

The file manager interface 108 allows a user to create a new business model or monitor existing ones for various entities.

The system also includes a spreadsheet engine 114 to convert a user's static spreadsheet-based business model into a system comprehensible model and to upload data from that system comprehensible model to the server 110. To do so, the spreadsheet engine 114 itself may also contain tagging engine aspects so that it can recognize tags added by the user.

In general, the spreadsheet engine 114 is a system component that resides on a server within the system. However, in some implementations, aspects of the spreadsheet engine 114 may reside on a user's computer as part of a client-server configuration, in which case, the parts would interact via some form of communication linkage between the two. The spreadsheet engine 114 is generally used for all system operations with respect to spreadsheet files, for example, copying files from the user's storage to the systems storage, extraction of tagged data, data validation, and acting upon controller requests.

In operation, the computer 102 will generally have read-write access to a shared network file storage system 112, in that it can write to this network file shared storage 112 and also read data back from it when required. The spreadsheet engine 114 has read-only access to the network file storage system 112 and is used to read a spreadsheet file from the network storage 112 and, upon request from the sync engine as described below, copy the spreadsheet file from the network file storage 112 to network shared storage 116. As will also be described in greater detail below, the system copy of the file will at some later time be pushed to the server 110 for further processing.

As depicted, the example server 110 is made up of a web server 118, a sync controller 120, a calc controller 122 and web services 124, although it could also include other servers, services or programming as well, though not relevant to understanding the instant application.

The sync controller 120 maintains synchronization between the system copy of the business model and the user's copy of the business model by both pushing the system copy into a sync queue and overwriting the system copy with a newer version of the user's copy. The system copy can, thereafter, be placed into a calc workflow queue for additional processing.

The calc controller 122 receives the model from the calc workflow queue, extracts tagged data from the model, performs any necessary calculations on the model data and commits the data and associated tags to a network data store 126 through a series of workflow steps. Advantageously, the operations performed by the calc controller 122 are encapsulated from the user and work behind the scenes in performing the data push to the data store 126. Note that the data store 126 may be part of, or separate from, the network shared storage 112, 116.

The web services 122 includes the core system binaries that implement network communication among the various parts of the system 100.

Figure 2:
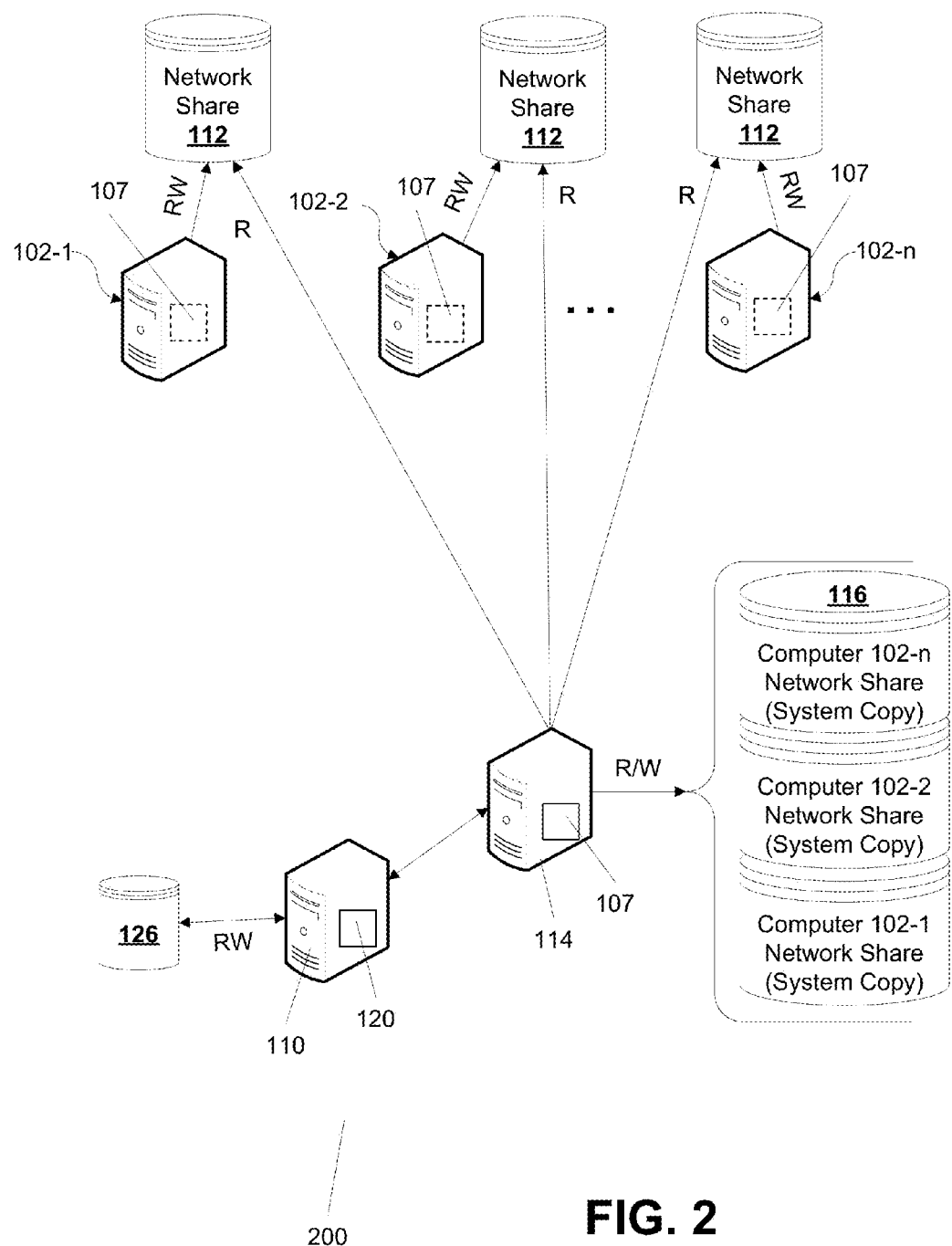
FIG. 2 illustrates, in high-level overview, the functional configuration of the sync control architecture which is involved in the sync process described herein.

FIG. 2 illustrates, in high-level overview, the functional configuration of the sync control architecture 200 which is involved in the sync process described herein. The architecture is made up of two or more networked computers 102-1, 102-2, ..., 102-*n* through which users access the spreadsheet files of interest. The spreadsheet engine 114 runs on one or more other computers on the network, which may be one or more computer(s) or network servers on the network, or some combination thereof. Depending upon the particular implementation, there may be one spreadsheet engine 114 for the entire system or multiple instances of spreadsheet engines 114 each located relatively near to the location where user spreadsheet files and storage 116 containing the System Copies of those files are located to minimize delay. In most implementations, the computer 110 and the computer on which a spreadsheet engine 114 resides will be physically different, and likely remote, computers. However, for some implementations, the spreadsheet engine 114 (or an instance thereof) can run on the same physical computer or server as the other computer 110.

The tagging engine 107 allows a user to perform the tagging function on a locally created spreadsheet-based business model as described herein. Depending upon the particular implementation, the tagging engine 107 can be implemented (in whole or part) in the user computers 102-1, 102-2, ..., 102-n (such as indicated by the dashed boxes), in the server implementing the spreadsheet engine 114, or some other network server. As shown, the tagging engine 107 is part of the server with the spreadsheet engine 114.

The computers 102-1, 102-2, ..., 102-n are each connected to the network accessible storage 112 which, depending upon the particular implementation, can be commonly shared among multiple computers, partitioned from one or more devices, whether or not uniquely associated with each (like a virtual network drive), or some combination thereof. As shown in FIG. 2, for purposes of illustration and explanation only, each of the individual computers 102-1, 102-2, ..., 102-n is individually connected to their own user network accessible shared storage 112. The spreadsheet engine 114 is connected to the system copy network accessible shared storage 116. Note that although these two different sets of storage 112, 116 are conceptually shown as separate, this is done merely for purposes of explanation, but may or may not be the case in actual implementation. Note further that, in general, the system copy network accessible storage 116 will not be user accessible, whereas the user network accessible shared storage 112 will be directly, and fully, accessible to users (i.e. Read-Write "R/W" accessible), for example, their own user partition or other storage.

The architecture 200 also conceptually includes the server 110 running the sync controller 120, which implements the sync workflow process. The sync controller 120 interacts with the spreadsheet engine 114 to effect the sync workflow described herein.

Finally, the architecture 200 conceptually includes a data store 126 where the data extracted for use with the network-based business model and its associated tags are stored. The data store 126 also includes all mappings needed for the sync controller 120 to identify what files, if any, need to be synced and to initiate a request to the spreadsheet engine 114 to perform the sync operation. Depending upon the particular implementation, this storage 126 can also be part of the other storage 112, 116 described above or separate storage. In addition, depending upon the particular implementation, the storage can be implemented most simply as flat file storage or, for more complex arrangements, as a database (with or without a dedicated database server), or use any other storage approach appropriate for the particular implementation. As illustrated for conceptual purposes, this data storage 126 will be considered to be a database that is separate from the other storage 112, 116. This database 126 will be described further below.

Bearing the above in mind, as illustratively shown in FIG. 2, an instance of the spreadsheet engine 114 is functionally connected to the storage 112 on which the tagged spreadsheet file is saved by the user to be read during the sync process. The spreadsheet engine 114 is typically only permitted read-access to the user's storage 112, to allow it to pick up the user's spreadsheet-based business model at the time of a successful sync request and save a copy of that model into the system specified and controlled network accessible shared storage 116 along with the appropriate timestamp, for example as a system-named file with the timestamp for the file embedded as a part of its name.

In functional overview, the sync controller 120 is responsible for initiating the sync request to the appropriate spreadsheet engine 114, which performs the sync operation, thereby, causing a copy of the user's model to be copied to the network accessible shared storage 116 along with the appropriate timestamp, the timestamp for that file to be updated in the database 126 and the model to be pushed to the queue for the calc controller 122 for further processing by the calc engine as described herein.

Figure 3:
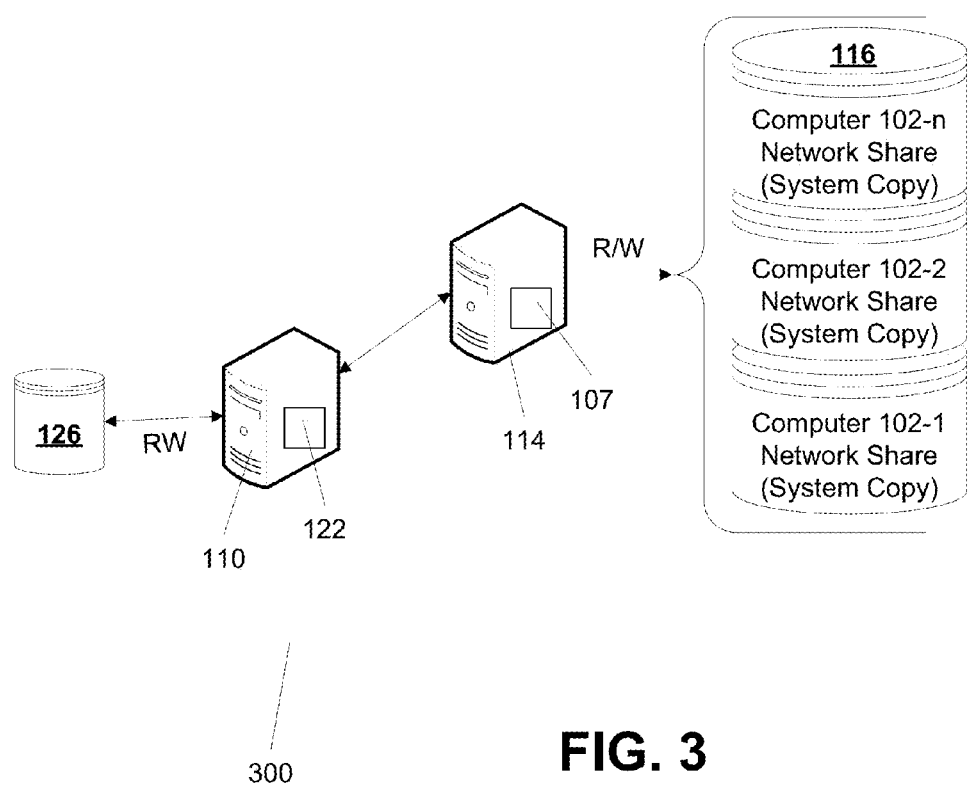
FIG. 3 illustrates, in high-level overview, the functional configuration of the calc control architecture involved in the calc process described herein.

FIG. 3 illustrates, in high-level overview, the functional configuration of the calc control architecture 300 involved in the calc process described herein. As shown, for simplicity the relevant part of the architecture 300 is substantially the same as the architecture 200 of FIG. 2, however it should be understood and appreciated that this need not be the case with respect to the specific physical hardware involved nor with respect to the computer(s) involved in effecting the calc workflow process, such configuration being a function of the specific implementation, not the process to be performed.

As shown in FIG. 3, the major difference relative to FIG. 2 is that the calc controller 122, which implements the calc engine by performing the calc workflow process, is running on the same server 110 but instead of (or in addition to) the sync controller 120 at this point in time, although in practice, the two may be operating concurrently with respect to different files and/or models. The calc controller 122, as the calc engine, is tasked with performing the calc workflow operations, which will include data validation, extraction, performing auxiliary calculation and/or aggregation using the data, data persistence and data push to some other system.

In general, as noted above, the calc workflow process involves the spreadsheet model being picked up from the system network shared storage 116 by the spreadsheet engine 114 and processed in the calc workflow queue by the calc controller 122 as a result of any of numerous actions. For example, for illustration purposes only, such actions could include: (i) the sync controller detecting some changes in the spreadsheet model saved on the network-shared location and placing the model on the calc workflow queue, (ii) a foreign exchange (FX) rate change received by the system such as infusion of new spot and forward rates, which might necessitate recalculation by the system of all impacted spreadsheet models in current and open reporting periods, (iii) the insertion, update or deletion of one or more transactions for an investment involved in a spreadsheet model, thereby causing a recalculation of the model for the investment.

At the end of the calc workflow processing operation, all valid data and tag information extracted from the spreadsheet model will be persisted to the data store 126.

As can be inferred from the above, our approach is conceptually made up of three workflow parts: the tagging workflow, the sync workflow and the calc workflow.

The first part of our approach is tagging. Tagging is a user initiated and controlled process whereby a user identifies data in the spreadsheet-based business model that our approach will operate on and with.

Figure 4:
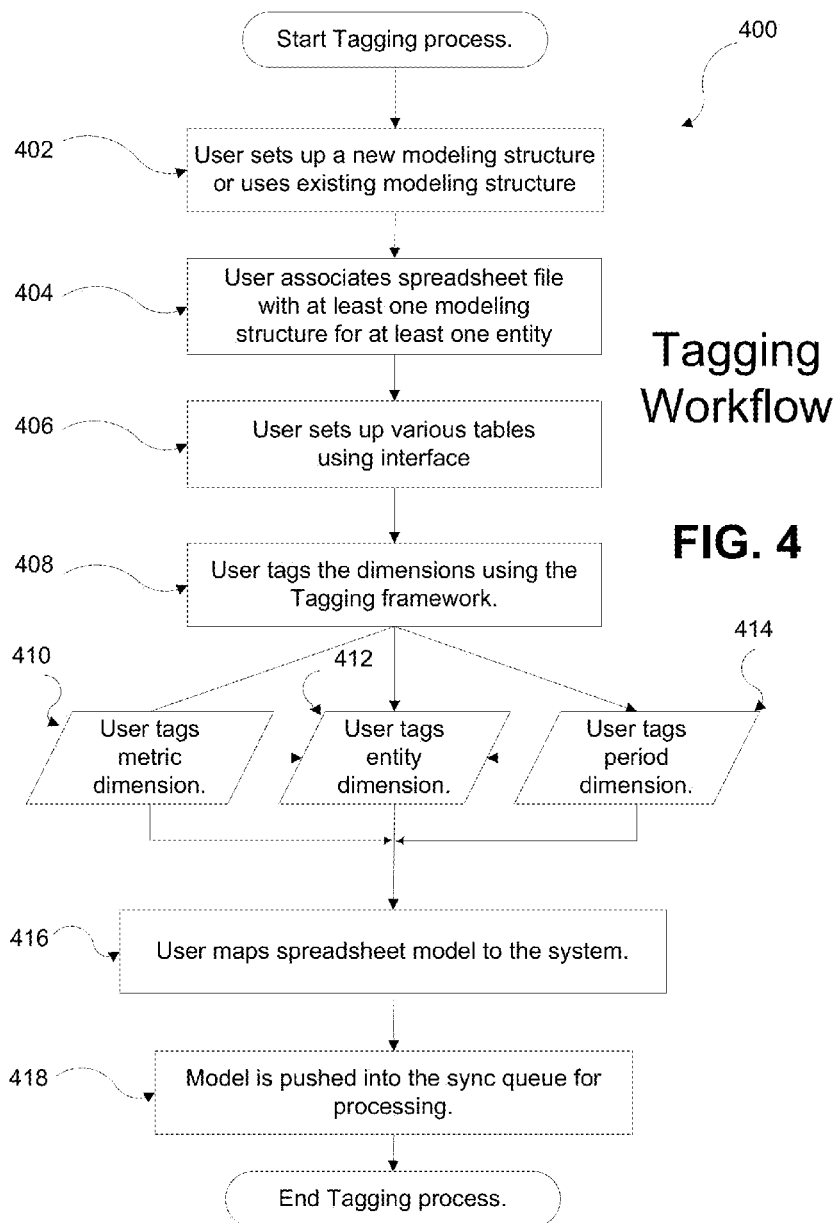
FIG. 4 is a flowchart illustrating, in simplified exemplary fashion, the tagging workflow.

FIG. 4 illustrates, in simplified overview an example flowchart 400 depicting the tagging workflow, through which a user interactively tags certain data in a given business model in the manner described herein which, in turn, facilitates conversion of a static spreadsheet-based business model into a dynamic, system comprehensible, model whose data can flow within the intricacies of the system.

As depicted in FIG. 4, the process proceeds as follows, the user initiates the tagging workflow process by either setting up a new modeling structure or by accessing an existing modeling structure (Step 402). A modeling structure is the hierarchy based on which any entity can be modeled in a given period. In general, to be usable, each entity is initially defined in the system according to a default structure that constitutes itself at the root level with no children underneath. The user may then develop additional, more complex, modeling structures made up of two or more entities. The user is also generally tasked with ensuring that this modeling structure is accurately setup, because, if not, the entities or their children tagged in the model might be ignored for purposes of calculations and aggregations in spite of being tagged accurately. Depending upon the particular implementation, an entity can be any kind of asset, typically one for which the value changes or produces income or revenue over time, and the performance of which can be modeled using a spreadsheet.

The user launches the file in the spreadsheet program and associates the file with at least one modeling structure and/or entity defined in the system (Step 404). This informs the system that the file is indicative of at least that entity known to the system. The user also sets up various tables (Step 406) using an interface such as described herein. The creation of interfaces, being known and requiring conventional programming techniques, will not be described herein. Moreover, since the format of such interfaces will be determined by the particular implementation, only representative examples will be described, with the particulars of creating such interfaces and their specific formats being irrelevant to understanding our approach.

Tables are a set of rules that depict the actual location within the spreadsheet file of the data that is tagged within that file. The system uses the tables to extract that data from the spreadsheet for calculation (if necessary) and save purposes. The rules (and hence the tables) include implied limitations to ensure that the data tagged within the spreadsheet file can be properly read and understood by the system with no room for any ambiguities or doubts. For example, to avoid ambiguity in tagging a table consisting of a single row and single column, a limitation could be that data is presumed to be located to the right of a tag for a row and below a tag for a column. Alternatively, a limitation could be that data is read from the left of a row tag and below a column tag. Still another alternative limitation is that data is presumed to be located to the right of a tag for a row and above a tag for a column. Yet another alternative limitation is that data is presumed to be located to the left of a tag for a row and above a tag for a column. Other example limitations could be, for example, where a period tag is immediately adjacent to and shares a row or column with another tag, the data will be read, in one example, from the cell(s) closest to the period tag, and in another example, from the cell(s) closest to the other tag. These are just a few representative illustrative examples of the types of limitations that can be imposed to ensure proper reading and understanding by a particular system implementation, other alternative or additional limitations can be imposed as needed or desired.

The user thereafter proceeds to tag the various dimensions (Step 408) in the spreadsheet file as will be described in greater detail below. In general overview however, any data cell that will have its value extracted needs to be tagged for at least two dimensions, the metric dimension (Step 410) and the entity dimension (Step 412), which can occur in any order or be interspersed. Optionally, a value can be tagged with a period dimension (Step 414) as well, which can also occur in any order relative to the other tagging or be interspersed therewith. In accordance with the rules, as specified in the tables, the optional period dimension, as well as the metric dimension and the entity dimension, have to be tagged within designated areas or extraction will not occur properly. Again, the rules serve the purpose of limiting and restricting what will be extracted in that, any tagging done outside the considerations of these rules will be ignored from a system standpoint. In other words, non-compliance with the rules will result in treatment of tagged cells as if such tags did not exist at all.

Once the tagging of the spreadsheet is complete, the file is saved. This enables converting the static "local" spreadsheet model that has been tagged into a system comprehensible model. The process then continues with the saved file being "mapped" to the network using the File Manager 108 interface (Step 416). Mapping results in the system comprehensible version of the business model becoming known to, and locatable by, the system for further processing as described herein. Mapping occurs when a user, using the File Manager 108, causes the system to record the location of the file in the storage 112 on the network and begin periodically monitoring its timestamp to identify if a change has occurred so that, if a change has occurred, the system copy of the file stored in the network storage 116 can be sync'ed with the version in the user's storage 112 by the spreadsheet engine 114. Alternatively or additionally, instead of mapping, the system can be provided with an "Upload" feature. With the "Upload" feature, the user can cause a direct upload of a validated model already present in the user's storage 112, from the user's storage 112 to the network storage 116. Thus, the "Upload" option, in effect, implements a fully automated "mapping" operation.

Once the system comprehensible model is created and mapped, the model is pushed into a sync queue (Step 418) for further processing by the sync controller 120 implementing the sync engine that performs the sync workflow.

Figure 5:
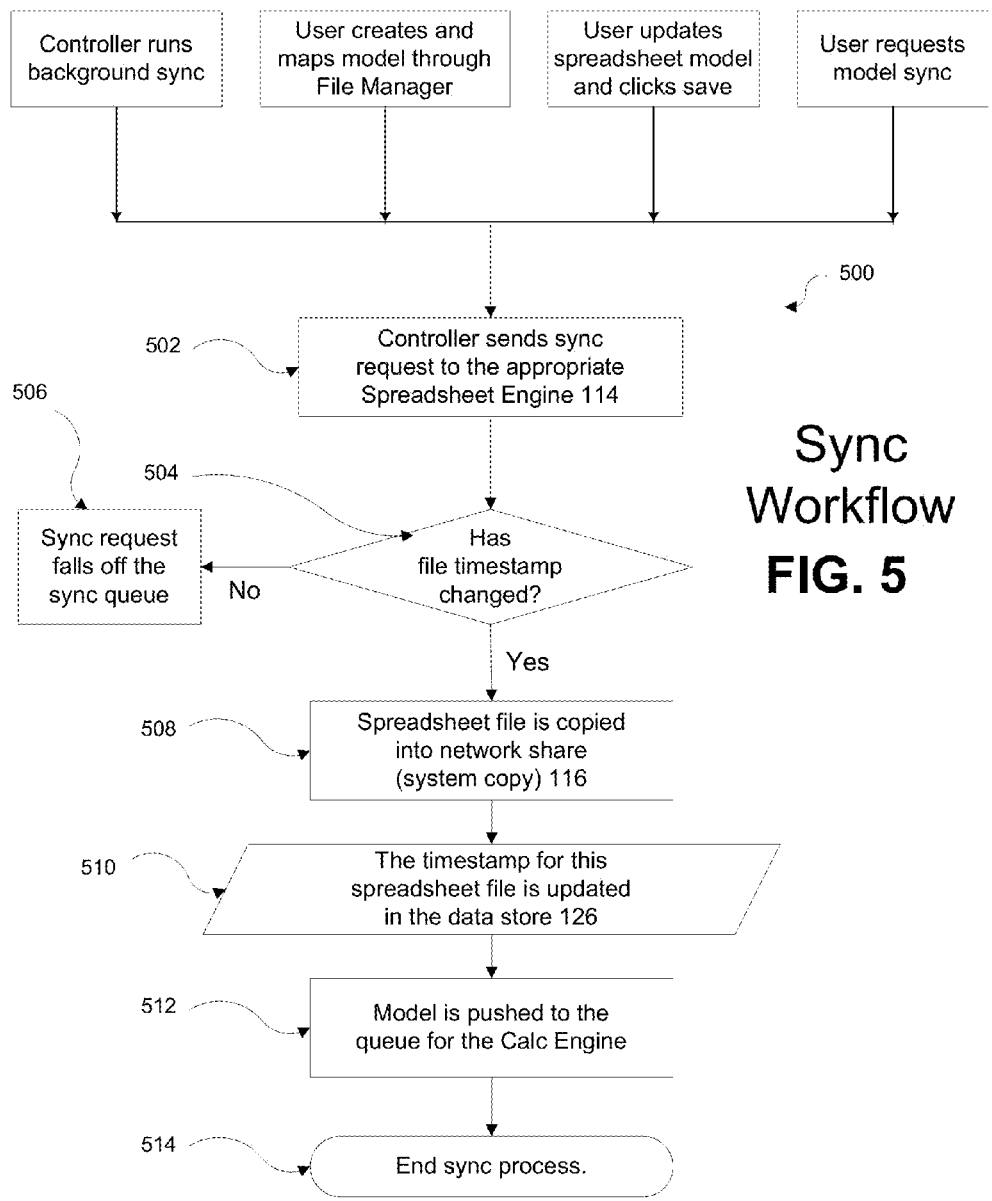
FIG. 5 is a flowchart illustrating, in simplified exemplary fashion, the sync workflow.

FIG. 5 is a flowchart 500 illustrating in simplified exemplary fashion, the sync workflow from the point of initiation of the sync process to the point where the model is pushed into the calc workflow queue for further processing as described herein.

The sync process begins as a result of one of four actions: (1) creation and mapping of a model using the File Manager 108 interface (i.e. whenever a user maps a model through the file manager interface), (2) the user updating and saving a tagged network-based spreadsheet model (i.e. stored on the shared network storage), (3) the user initiating a sync operation (by selecting a "Sync" control located in the File Manager 108 interface), or (4) the sync controller 120 automatically running a sync operation itself, for example, after a specified time period has elapsed since the last sync. By way of example for this fourth action, the sync controller can be set up to check once every set time period, for example, 30 seconds, if the timestamp of the file being operated on is newer than the one saved in the network shared storage and some longer period, for example, 15 minutes, have elapsed since the last sync operation occurred.

While these four actions are contemplated typical instances when a sync request can be initiated on a model, they should not be deemed to be limiting or exhaustive, but merely suggestive of some reasons for causing a synchronization to occur.

As a result of one of the preceding actions, and presuming proper, valid tagging of contents of the business model as described herein, the processing continues with the sync controller sending a sync request to the concerned spreadsheet engine 114 (Step 502). The spreadsheet engine, in turn checks whether the timestamp on the file has changed since the last sync operation (Step 504). If not, the sync request is removed from the sync queue (Step 506) and will not be processed any further. If there is a change in the timestamp, then the file with the changed timestamp gets copied into the system designated network shared storage 116 (Step 508). Thereafter, the sync controller 120 updates the timestamp for the file in the database 126 (Step 510). Then, the sync controller 120 pushes the file into the calc workflow queue (Step 512) to be processed by the calc engine implemented by the calc controller 122. At this point the sync workflow is complete (Step 514).

Figure 6:
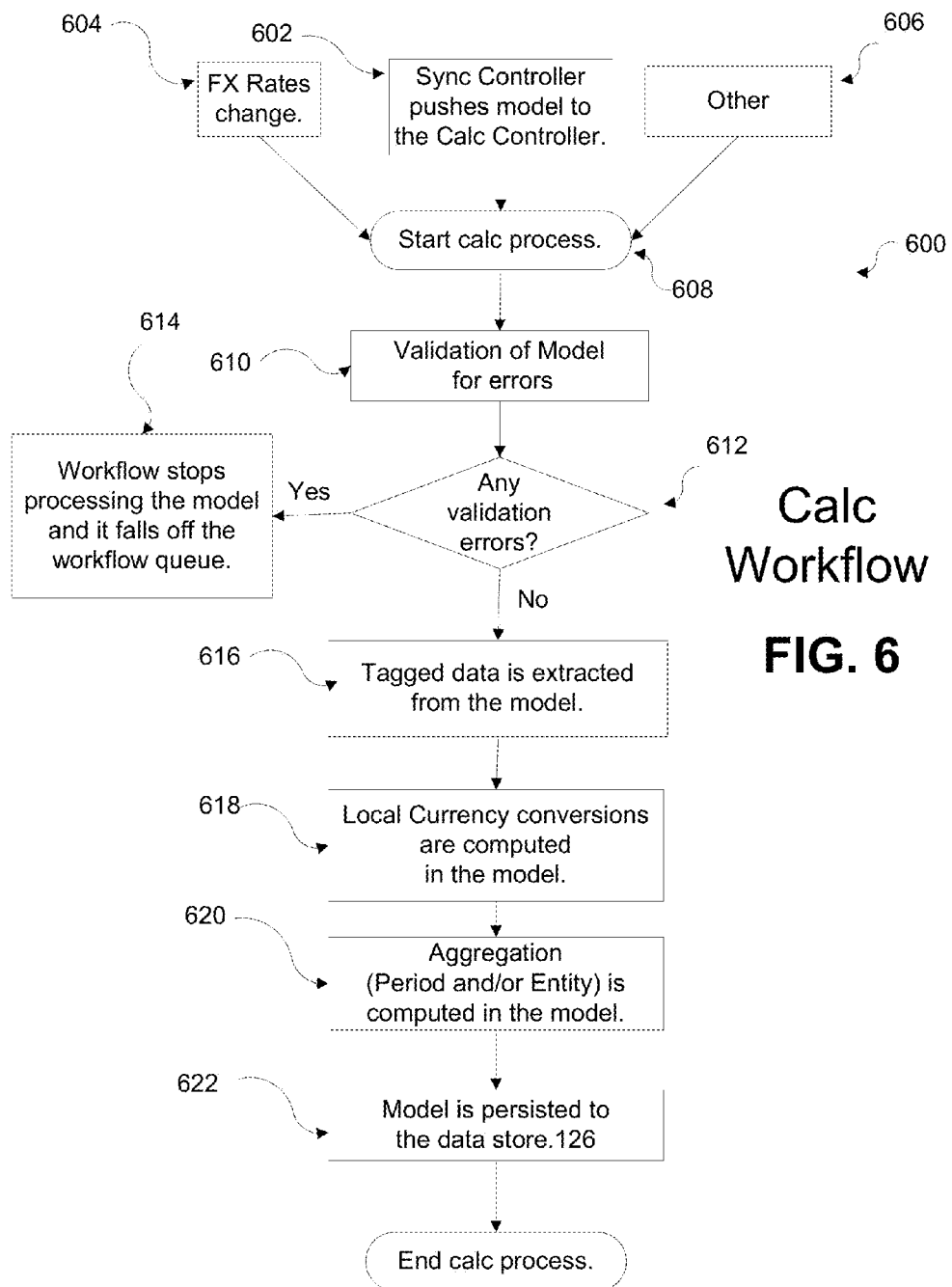
FIG. 6 is a flowchart illustrating, in simplified exemplary fashion, the calc workflow.

FIG. 6 is a flowchart 600 illustrating, in simplified exemplary fashion, the calc workflow from the point the model is pushed into the calc workflow queue by the sync controller 120 to the point where the model data is saved to the database 126.

In general, as mentioned above, the calc workflow is initiated by a push of the model into the calc workflow queue by the sync controller 120 (Step 602). However, this need not be the only way that the calc workflow can be invoked for a model. Another action could also trigger the calc workflow, for example, if the system covers assets that are denominated or locally tracked in different currencies, in order to generate meaningful reports that aggregate the value of, or income or dividends from, some of those assets may need to have values converted so that all are in a common currency. In the case of a currency conversion for example, an FX rate change in a system affected by an FX feed could automatically trigger the calc workflow without user action. (Step 604). Similarly, other calculations may need, or have, to be performed (Step 606), for example two different jurisdictions may require assets to be carried differently (e.g. at cost versus at current market) and reports for those two different jurisdictions might need to have adjustments made to reflect that difference.

When a model is pushed into the calc workflow queue for processing by the calc controller 124 processing begins (Step 608). First, the model is checked for errors (Step 610) and different actions may be taken as a result (Step 612). If the model fails the validation check, then processing is stopped and it promptly falls off the workflow queue (Step 614). If the validation check is successful, the model is pushed into an extraction sequence (Step 616) which extracts the tags and their associated data from the model. Next, if currency conversions are required, these conversions are performed (Step 618) and the converted values are inserted into the model, along with and/or in place of, the values in the local currency.

Similarly, periodic and/or entity information can be "rolled up" or aggregated for the model at this point (Step 620). In general, data extracted from the spreadsheet file can be rolled up or aggregated from lowest to highest level of detail. For example, periodic tagged data which has been tagged at a monthly level can be summed during the aggregation operation to a quarterly level, and, if desired, from quarterly to annual, from annual to inception to date (ITD), etc. However, note that data tagged directly at a higher level, for example, the quarterly or annual level, cannot be drilled-down to a lower level of detail such as monthly or daily. However, this should not be construed as precluding lower level estimation, manipulation or calculation of average values, notwithstanding the lack of such low level data, if necessary. For example, data tagged as monthly income could be divided by the number of days in the month in as part of a calc workflow calculation to report "average" daily income for that month or multiple data points reflecting daily currency fluctuations could be smoothed, linearized, rounded or truncated where appropriate to ascertain a rate on a given day within a month to estimate the value of a specific event, like a payment, on that day or to reflect or remove the effect of some hedging strategy.

A second category of aggregation that can be carried out on the model, in addition to or instead of period aggregation would be entity aggregation. With entity aggregation, datapoints extracted from the spreadsheet file can be summed up or aggregated for one or more entities at leaf node(s) up to the final parent level of detail according to the modeling structure for that entity. In general, by default in most implementations, every entity will have a modeling structure set up for it in every reporting period for just that entity. However, in such cases, the user can always proceed to add any number of other modeling entities, which themselves may contain one or more child entities, grandchild entities, etc. as leaf nodes. As should now be appreciated, this multi-leveled hierarchy can be easily set up in the modeling structure. In accordance with the hierarchy for an entity, the data is aggregated from the child entities to their respective modeling entities and finally up to their ultimate parent entity level. At this point it should be further understood that the currency conversion, aggregation or other computational steps could occur in any logical order or, in some cases, even wholly or partially in parallel.

Finally, the calc workflow completes with a save operation (Step 622) in which the tagged data and associated tags are saved to the network data storage 126 and the calc workflow process is complete.

Figure 7A:
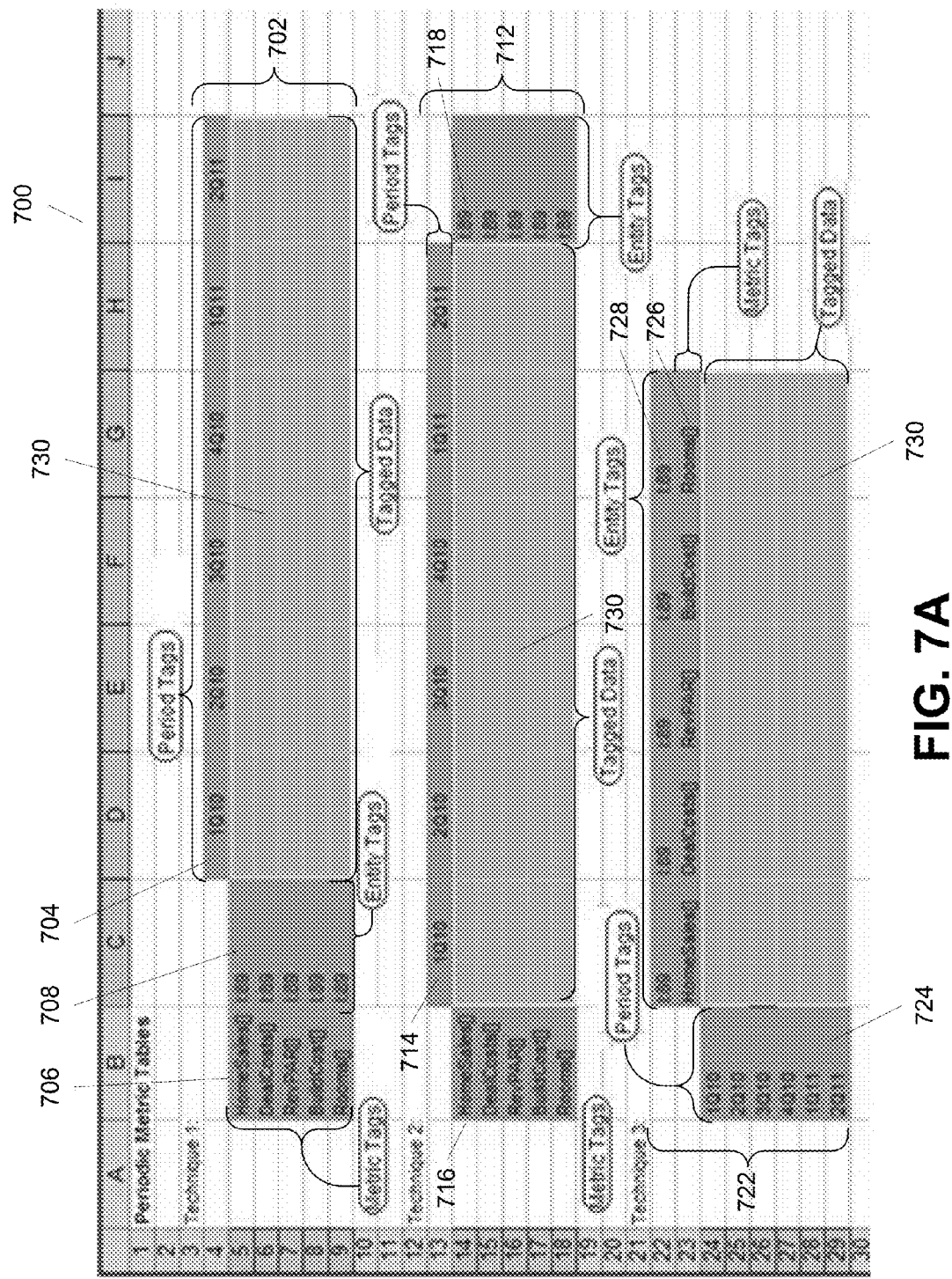
FIG. 7A and FIG. 7B illustrate, in simplified form, a portion of a spreadsheet-based business model containing tagged cells.
Figure 7B:
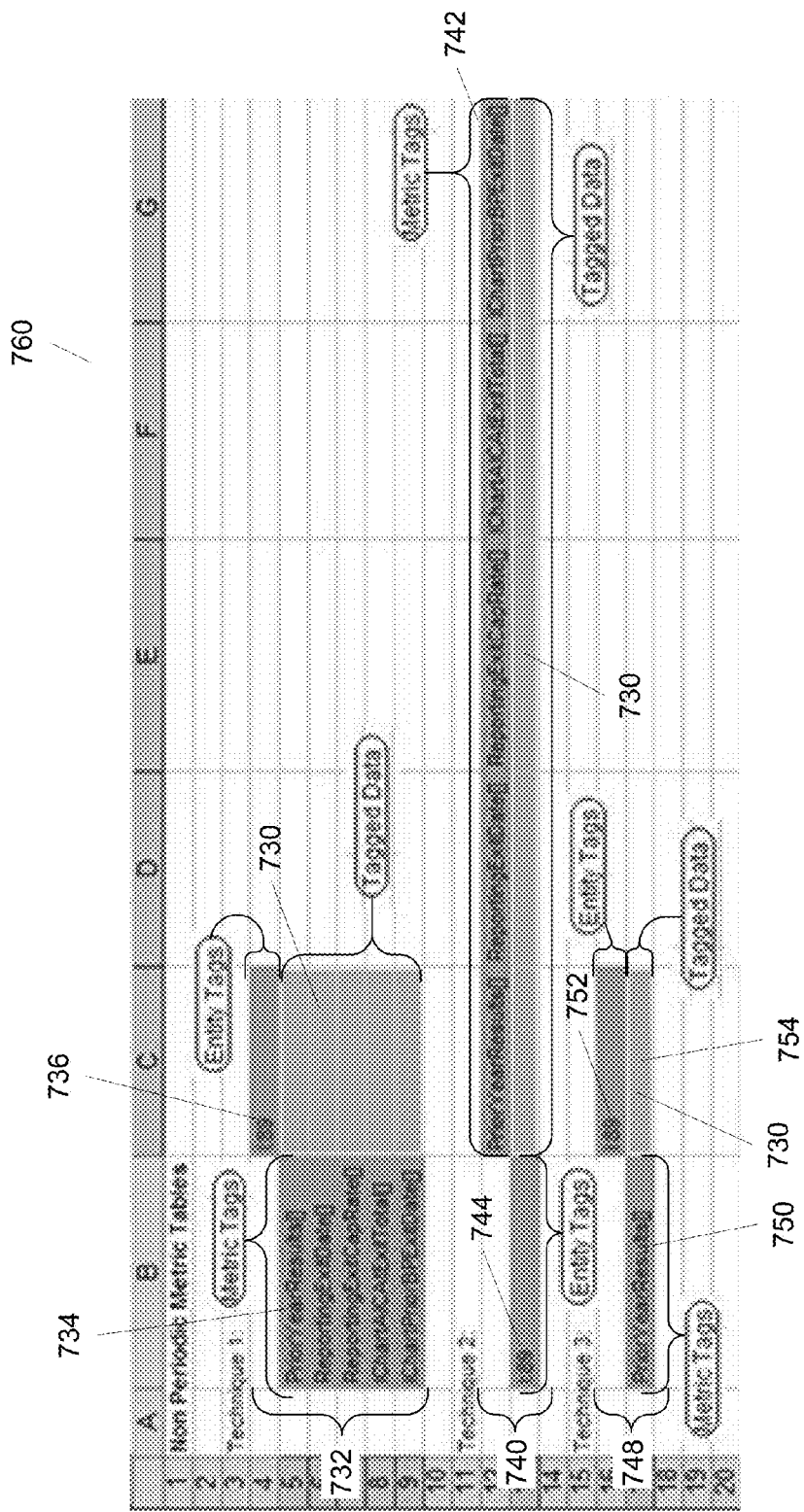

Turning now to FIG. 7A and FIG. 7B, which illustrate, in simplified form, a portion 700 of a spreadsheet-based business model containing tagged cells to illustrate tagging.

In simplified overview, a "tag" is a delimited standard label or string that is defined in the system to indicate a characteristic about what the data represents. In general, there must be at least one tag for every characteristic that could be used in a business model for data that the system may be expected to extract. For example, an entity tag is a label or string that indicates an investment entity to which the data pertains. There must be a way of uniquely identifying, using a tag, every entity that could be part of a business model. Similarly, a metric tag is a label or string that denotes some other characteristic of the data. For models relating to real estate assets, tag could be defined to represent, for example, initial cost, individual or aggregate utilities cost, rental rate, square footage, different applicable taxes, revenue, occupancy percentage, or any other characteristics. Again, there must be one tag that uniquely identifies each characteristic that could be part of a business model. In addition, a period tag is a label used to denote a time period for the data to which it is applied. For example, hour, day, week, month, quarter, year, etc.

In all cases, there must be a tag for the finest granularity of data values that a user would wish to make known to the system for extraction. Thus, as described below, a dimension tag could represent a characteristic that itself encompasses more than one other characteristics for which there are other dimension tags. For example, a specific "entity" tag could specify an investment made up of two or more other entities that have their own unique tags. Similarly, a "metric" tag for "cost" might be used to encompass a sum of what could be separately tagged with tags for "rent," "utilities," and "property tax" costs.

Depending upon the particular implementation, tags can be denoted different ways, so long as they can be unambiguously recognized by the systems as such. For example, all entities in the system could be numbered and the entity tag could be as simple as that number flanked on one or both sides by one or more symbols as delimiters. Similarly, metric tags and/or period tags could be a string of characters indicative of the metric it represents and a delimiter. These delimiters for a tag could be any text, symbol or combination thereof, such as: "[", "]", "{", "}", "<", ">", "I:", "En#", "!@", or any other parse-able unambiguously recognizable approach within a spreadsheet, or even using more complicated entries containing, for example, one or more delimiters and GPS location coordinates, equity, bond or commodity trading symbol, postal code, or any other unambiguous label, symbol(s) or string.

As noted generally above, the various rules establish the parameters the user will follow while generating tables around their data definition in the spreadsheet model. In general, at a high level, there are at least two categories of rules, rules for periodic metrics 702, 712 and 722 (FIG. 7A) and rules for non-periodic metrics 732, 740 and 748 (FIG. 7B).

As described herein, the rules for periodic metrics involve tagging all three dimensions i.e. period, metric and entity dimensions, whereas the rules for non-periodic metrics involve tagging only the metric and entity dimensions. However, implementers can create one or more additional or alternative dimensions, in which case such other implementations can involve additional or alternative requirements such as allowing a periodic metric to involve tagging with only two dimensions, a period dimension and one other dimension.

FIG. 7A illustrates, in simplified fashion, three examples of rules specified for "Periodic Metric" data in an exemplary user model where all three dimensions are used. These example rule configurations, labeled "Technique 1," "Technique 2" and "Technique 3" each outline a different technique that can be implemented while defining the period, metric and entity dimensions through tagging. Note however, that to the extent that these three techniques are actually mutually exclusive because the same tags are used to show different configurations and, hence, could not simultaneously be present in a single table for a spreadsheet.

FIG. 7B illustrates, in simplified fashion, three examples of rules specified for "Non-Periodic Metric" data in a portion 760 of an exemplary user model where only two dimensions, the entity and metric dimensions are used (i.e. the optional period dimension is omitted).

As mentioned above, and as shown in FIG. 7A, different example rules 702, 712, 722, are shown with the different locations where the three dimensions can be tagged in accordance with specified rules denoted by the blue-green shaded cells, and the areas for tagged data denoted by grey cells. In this example, the period dimensions 704, 714 and 724 can be tagged vertically or horizontally, provided they are perpendicular at any given time to the metric and entity dimensions. Furthermore, the metric dimensions 706, 716 and 726, apart from being perpendicular to their respective period dimensions should be parallel, but not necessarily adjacent, as is obvious, to the entity dimensions 708, 718 and 728.

In contrast, as shown in FIG. 7B, the various rules 732, 740 and 748 suggest different ways in which non-periodic dimensions can be setup. Since these rules pertain to non-periodic metrics, there is no period dimension involved in any of these three "Technique" examples. For a non-periodic rule, the metric dimensions 734, 742 and 750 have to be tagged perpendicular to the entity dimensions 736, 744 and 752. Here, as shown, the metric dimensions involve multiple cell tagging for two of the rules 732 and 740 or simply single cell tagging in the last rule 748, so only a singular data cell area 754 would contain the tagged data.

Note that, where multiple cells are tagged, it is easy for the system to automatically recognize where the tagged data will be, i.e. at the intersection of the tagged columns and tagged rows. However, with some implementations, as can be seen with "Technique 3" in FIG. 7B, absent more information, single cell tagging in the "Non-Periodic" tables can present a problem in terms of automatically determining where the data resides because there will be two potential data cells defined by the intersection between the two tags (i.e. alongside one and above (or below) the other). Hence where single cell tagging 748 occurs, a rule must be explicitly specified to, or by, the user so that the user data is in the area 730 where the system would expect it to be. For example, the system can be configured to operate for single cell tagging of "Non-Periodic" tables such that the tagged data area 730 will always be expected in the cell location 754 depicted with grey shading, i.e. below one tag and to the right of the other tag. Of course, for this example, the system could alternatively be configured to expect the data area to be in the cell to the left of one tag and above the other.

The tagging process indicates the data to eventually be extracted for the purpose of saving to the network data storage. In general, during the extraction process, tagged but empty cells will be ignored by the extraction engine and, through use of a validation framework, invalid values (for example, overlapping cells of two different tables or rules, or resulting from a division operation where the divisor is (i) zero, (ii) an undefined/empty cell or (iii) a cell containing a non-numeric value), if any are identified and reported as errors.

Figure 8A:
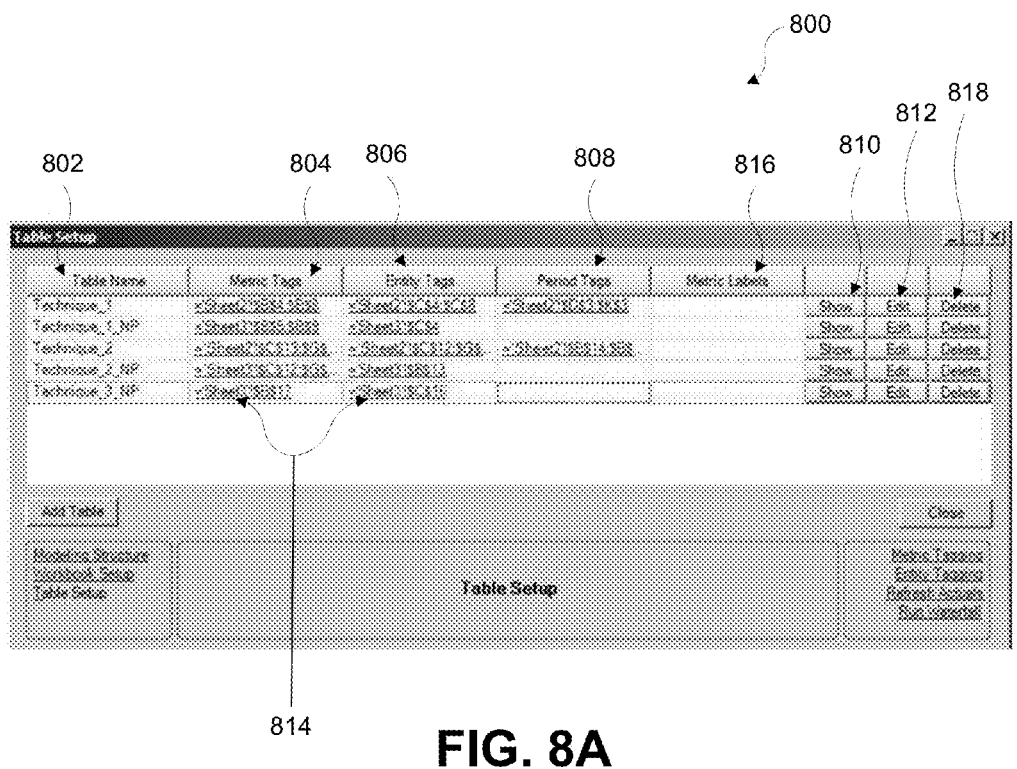
FIG. 8A and FIG. 8B illustrate an exemplary depiction of user interfaces used for creation/modification of the rules.
Figure 8B:
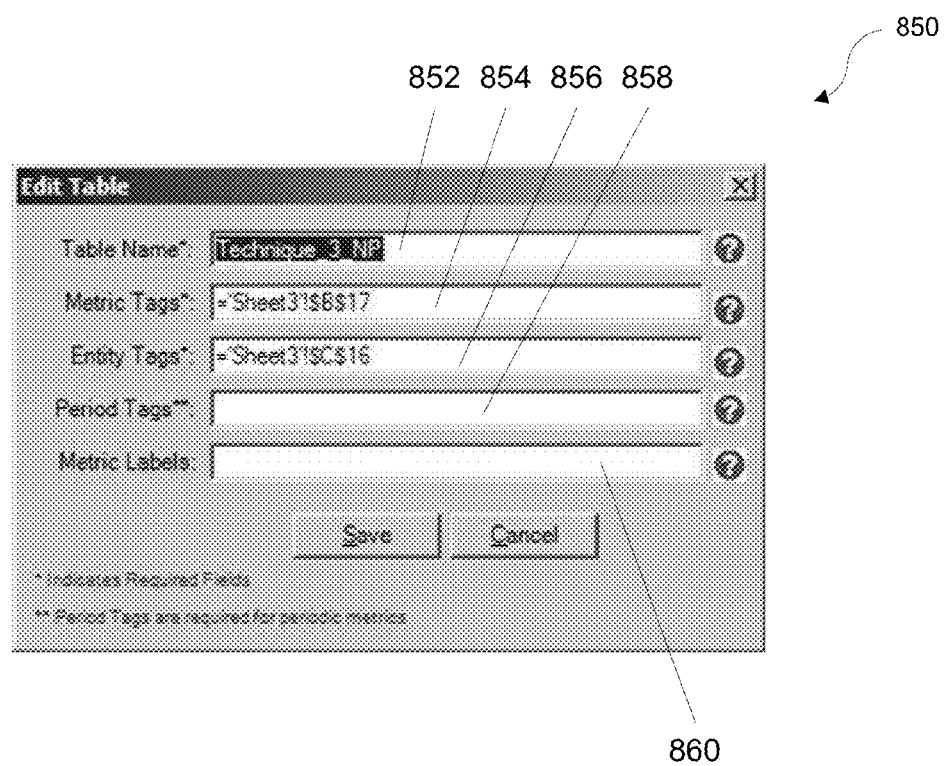

FIGS. 8A and 8B illustrate an exemplary depiction of two tagging user interfaces 800, 850 that can be presented, by the plug-in for the spreadsheet program 106, and used to create or modify rules, in this case, for some of the "Techniques" illustrated in FIG. 7A and FIG. 7B.

The interface 800 of FIG. 8A will contain a list of tables for that particular spreadsheet-based business model file. As shown in FIG. 8A, there is a list of the named tables, in this case, "Technique_1," "Technique_1_NP," "Technique_2," "Technique_2_NP" and "Technique_3," which correspond to most of the similarly labeled tables in FIG. 7A and FIG. 7B. As explained earlier, each table is a set of rules portraying the location(s) of data to be extracted and the tags associated with that data. In other words, it identifies to the system where it will find metric tags, entity tags and (optionally) period tags.

As shown, entries under the "Table Name" 802 column indicates the name for each set of rules. Note, for simplicity, it is contemplated that each "Table Name" will be unique across the spreadsheet model. The "Metric Tags" 804 column, "Entity Tags" 806 column and "Period Tags" 808 column refer to the range of addresses in the spreadsheet which will respectively contain the metric, entity and (optional) period tags. As contemplated, the range address will be formatted in a specific, unambiguous manner, for example, as shown in FIG. 8A, the range address includes a worksheet identifier, for example, the worksheet name, and the cell labels for the range location within that worksheet. This, as shown, the rule for the Metric Tags of the table named "Technique_1" is "='Sheet2'!$B$4:$B$8" which specifies that the system will find the metric tags for this table in Sheet 2 of the spreadsheet within cells of column B rows 4 through 8, with the equal sign before the sheet name, the symbols between the first column indicator and each of the row and column indicators (other than the colon, which denotes a range) merely being delimiters used for parsing purposes.

In addition, the interface allows for optional additional labels, called "Metric Labels" 816 to be assigned. In general, when used, the range for metric labels usually parallel, and has the same start and end points, as the rule range for the metric tags. The Metric Labels allows the user to specify a more descriptive name for the corresponding metric tagged in the metric named range, to be more meaningfully indicative of what a user would refer to that metric with. For example, if a metric tag "[UtlC3]" is used to denote cells containing cost of a particular utility for a real estate asset, such as water usage, the user could use the metric tag to identify the applicable cells with "WaterUseCost" as a more meaningful label than "[UtlC3]." When used, Metric Labels lie in the same row or column as its metric tag label depending upon range orientation.

To the right of each line are a series of buttons, labeled "Show," 810 "Edit" 812 and "Delete" 818. Selecting "Show" 810 highlights the rectangular area within the named worksheet represented in commonality by these tags (i.e. the cells where they intersect and, hence, where data should reside). Selecting "Edit" 812 allows the user to edit an existing rule and make changes. "Delete" 818 allows the user, depending upon how it is implemented, to delete the whole line or one or more of the rules therein. In addition, each rule can optionally be configured as a hyperlink so that if a user selects that rule, they will be brought to that range of cells in the worksheet specified in the rule. When an implementation includes this optional feature for a rule being a hyperlink, this can be indicated to the user, for example as shown in FIG. 8A, by underlining the rule, or using some other means like bold or colored text, font change, font style change, background color, or some other indicator, the particular type of indicator being merely an implementation choice. Alternatively, some other mechanism can be provided to allow for switching back and forth between a rule and the range of cells to which it applies, for example a "jump" button or by selecting a "go to cells" icon or entry in a menu or toolbar.

FIG. 8B illustrates an example tagging-related user interface 850 presented to a user when they select "Edit" 812 which permits the user to modify an existing rule or, alternatively, add a new set of rules to the spreadsheet file. As noted above, the system is configured to include a validation framework which is used to ensure that, for example, the metric, entity and period (if applicable) tags are properly defined and the cells contain proper contents.

In the interface of FIG. 8B, there is a field 852 where the user can enter a unique, preferably meaningful and/or identifiable name for the table in the model that will be tagged, a field 854, 856, 858 where the address (or range of addresses) for each dimension (metric, entity and period) can be entered as well as a field 860 for the user to optionally enter a Metric Label. As can be seen, this range address follows the format described above by indicating the name of the worksheet on which the tag range is located followed by the physical range address. Alternatively, depending upon the particular implementation, the interface can be configured such that the user has separate fields to fill in for the sheet and range. In addition, although, the interface depicted in FIG. 8B is shown as using the delimiters, the interface could be configured such that a range can be entered in the conventional spreadsheet format (i.e. "E3:E7" to represent cells E3 through E7) and the system could parse and reformat the entry as needed.

Figure 9A:
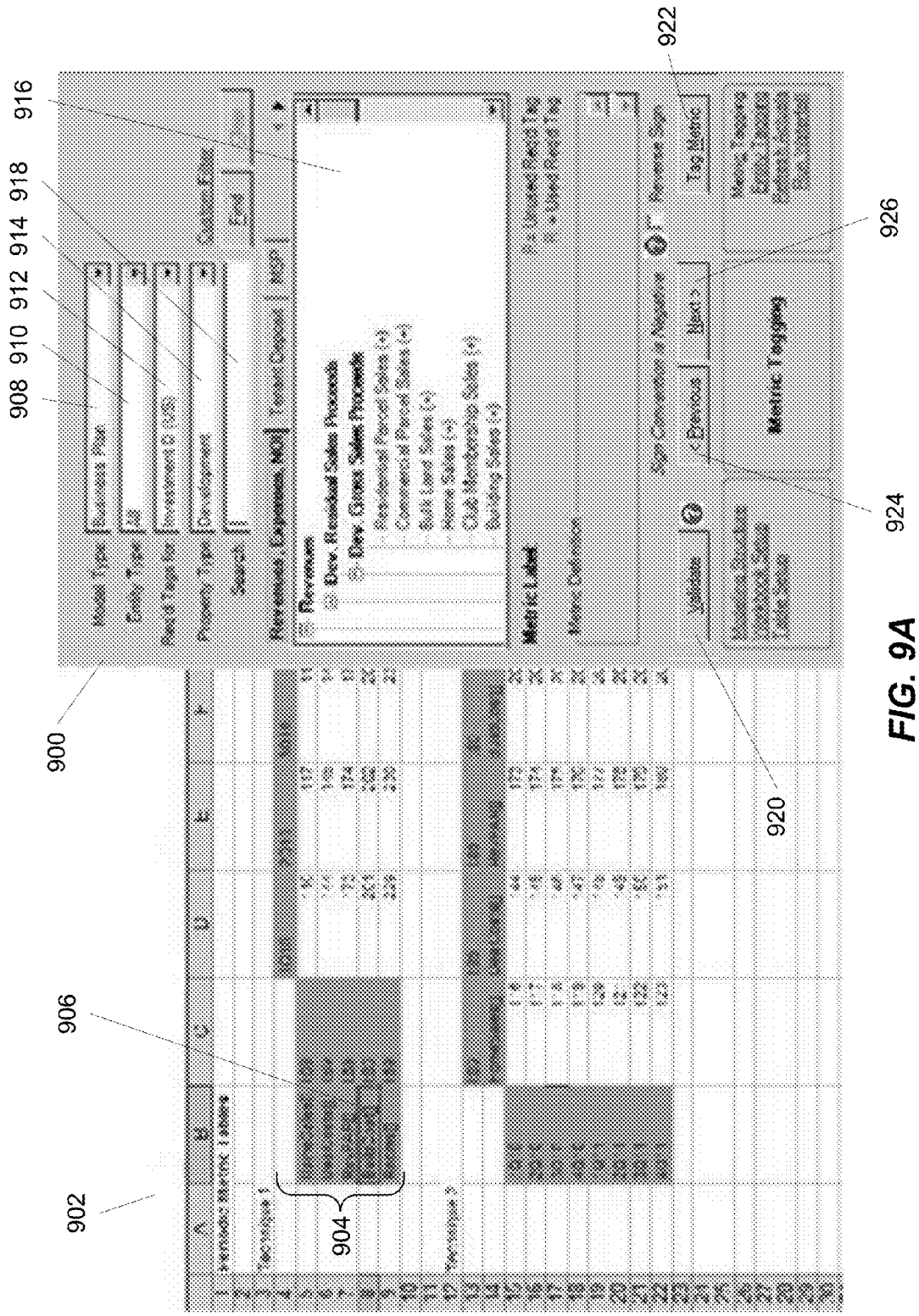
FIG. 9A and FIG. 9B illustrate an example interface used to tag a metric dimension.
Figure 9B:
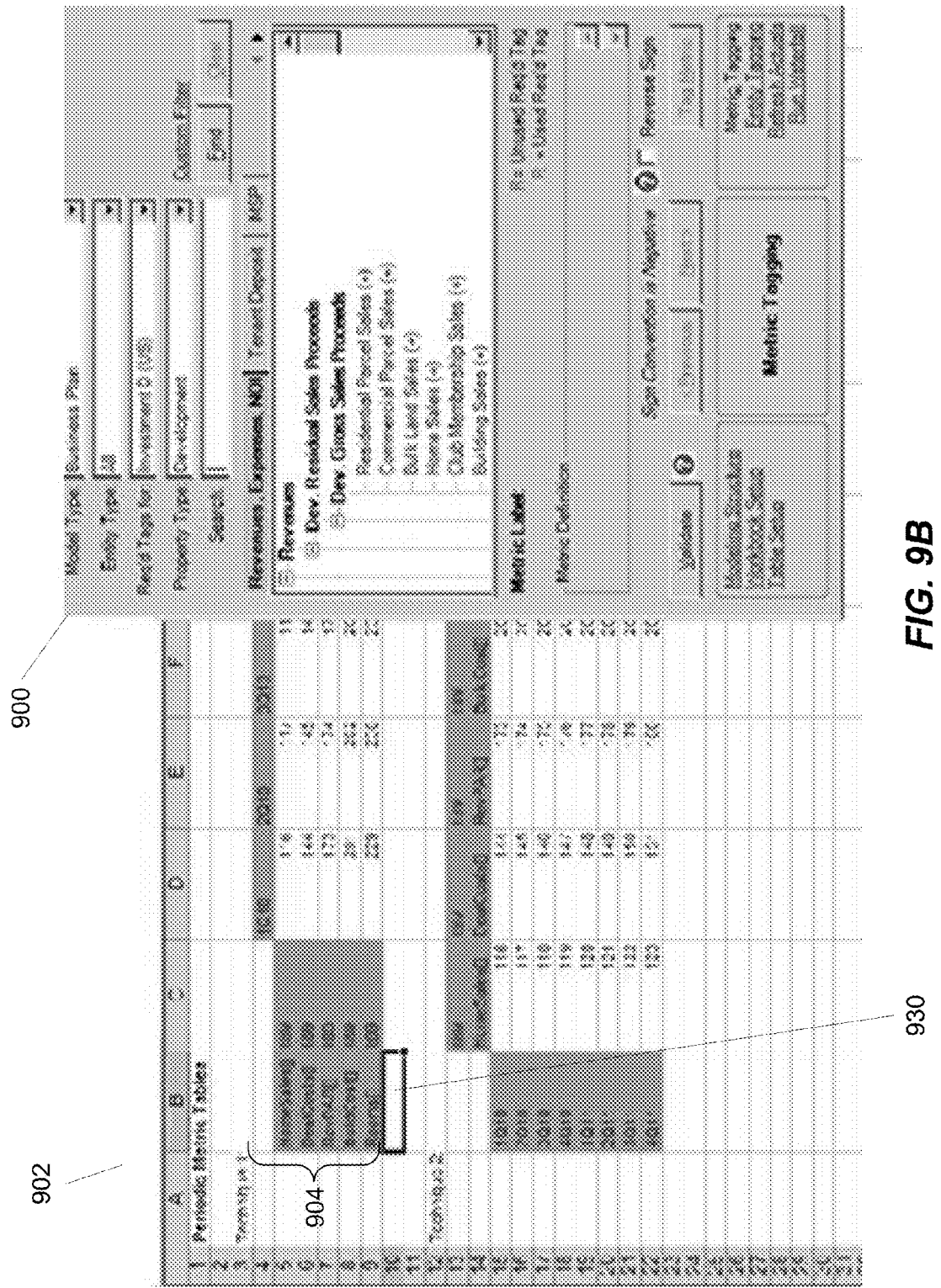

FIG. 9A and FIG. 9B illustrate an example interface 900 used to tag a metric dimension, superimposed over a portion 902 of an example business model relating to a real estate investment. In FIG. 9A and FIG. 9B, a table 904 called "Technique 1" has been tagged with tags for three dimensions. Based upon the specific filter selection(s), for example, the type of model 908, the type of entity 910, those tags required 912 for a particular entity, as well as specify the type of property 914, the corresponding information will be displayed in the window 916. Collectively, selectable information 908, 910, 912, 914 allows the user to filter, and thereby determine, which metrics appear in a window 916 of the interface 900. Moreover, by selecting one cell 906 in the defined metric dimension range of cells B5 through B9, in this example cell B8, which was already tagged with a metric dimension tag, the corresponding metric information, if present in the window 916 of the interface 900, will be highlighted. Optionally, a search field 918 can also be provided in the interface to allow the user to specify a search criteria that will, in turn, cause a filtered subset of metrics containing that term or meeting that criteria to appear in the window 916.

Selection of "Validate" 920 invokes the validation framework and can further trigger generation of a client side validation report which identifies errors or problems and allows the user to make corrections to the model before proceeding with the syncing operation to be described below.

Selection of "Tag Metric" 922 allows the user to tag a specific metric specified by a selection within the window 916 to the spreadsheet file in the selected cell.

Additionally, the interface can include other functionality, such as navigation. As shown in this interface 900, "Previous" 924 and "Next" 926 allow the user to traverse the named range for the particular metric, for example from left to right or from top to bottom and vice versa, depending upon the range orientation when defined (i.e. vertical or horizontal).

FIG. 9B illustrates the behavior of the interface if the user selects a cell out of the metric named range in some other portion of the spreadsheet file. Specifically, as shown, the user has moved the cursor to an untagged cell 930 (i.e. cell B10, which is a cell located outside the defined metric dimension range). As a result, some controls 922, 924, 926 are disabled and no functionality is possible. In general, this is the case whenever a user moves outside any dimension as specified by a rule.

Figure 10A:
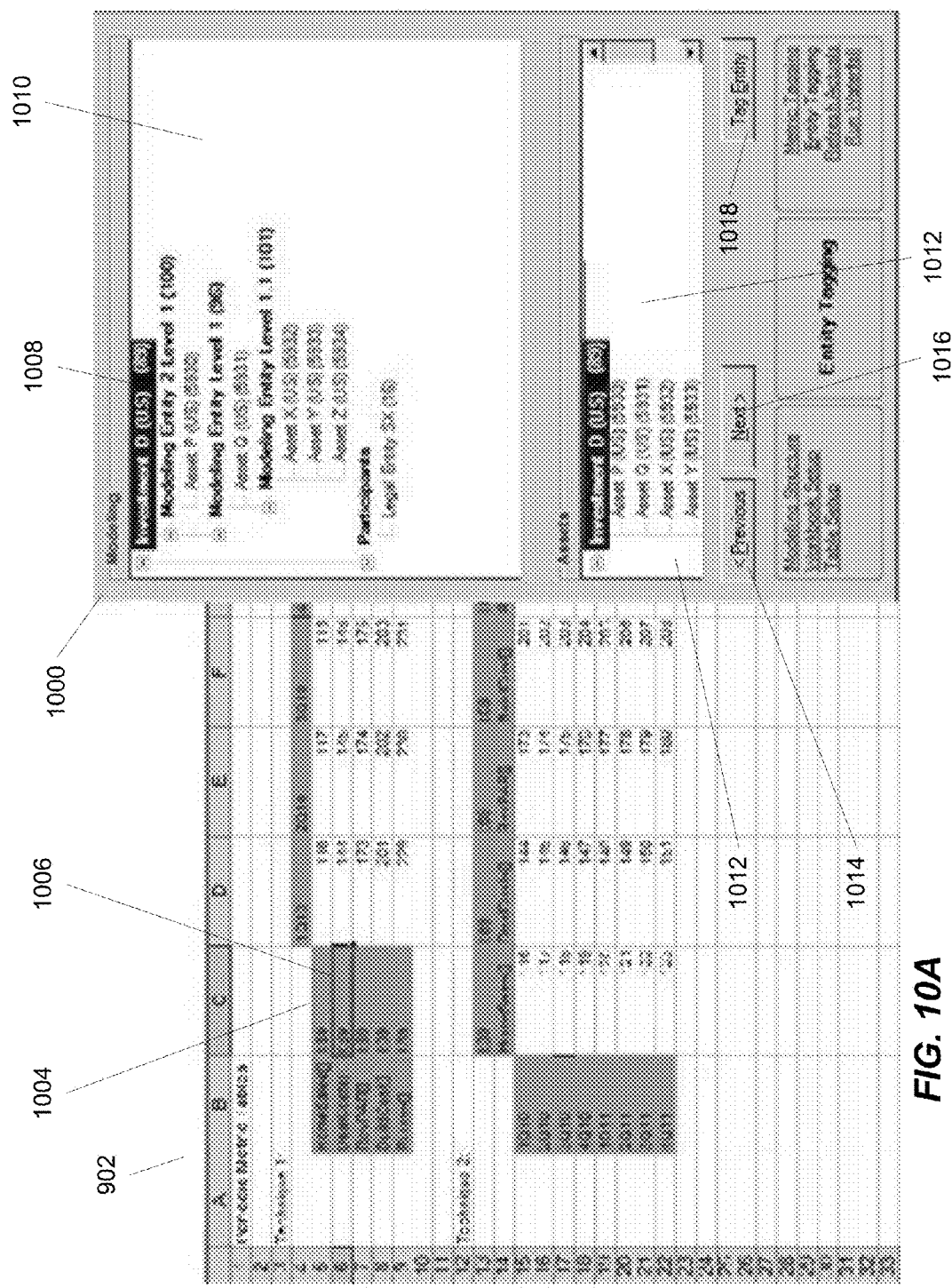
FIG. 10A and FIG. 10B illustrate an example interface used to tag an entity dimension.
Figure 10B:
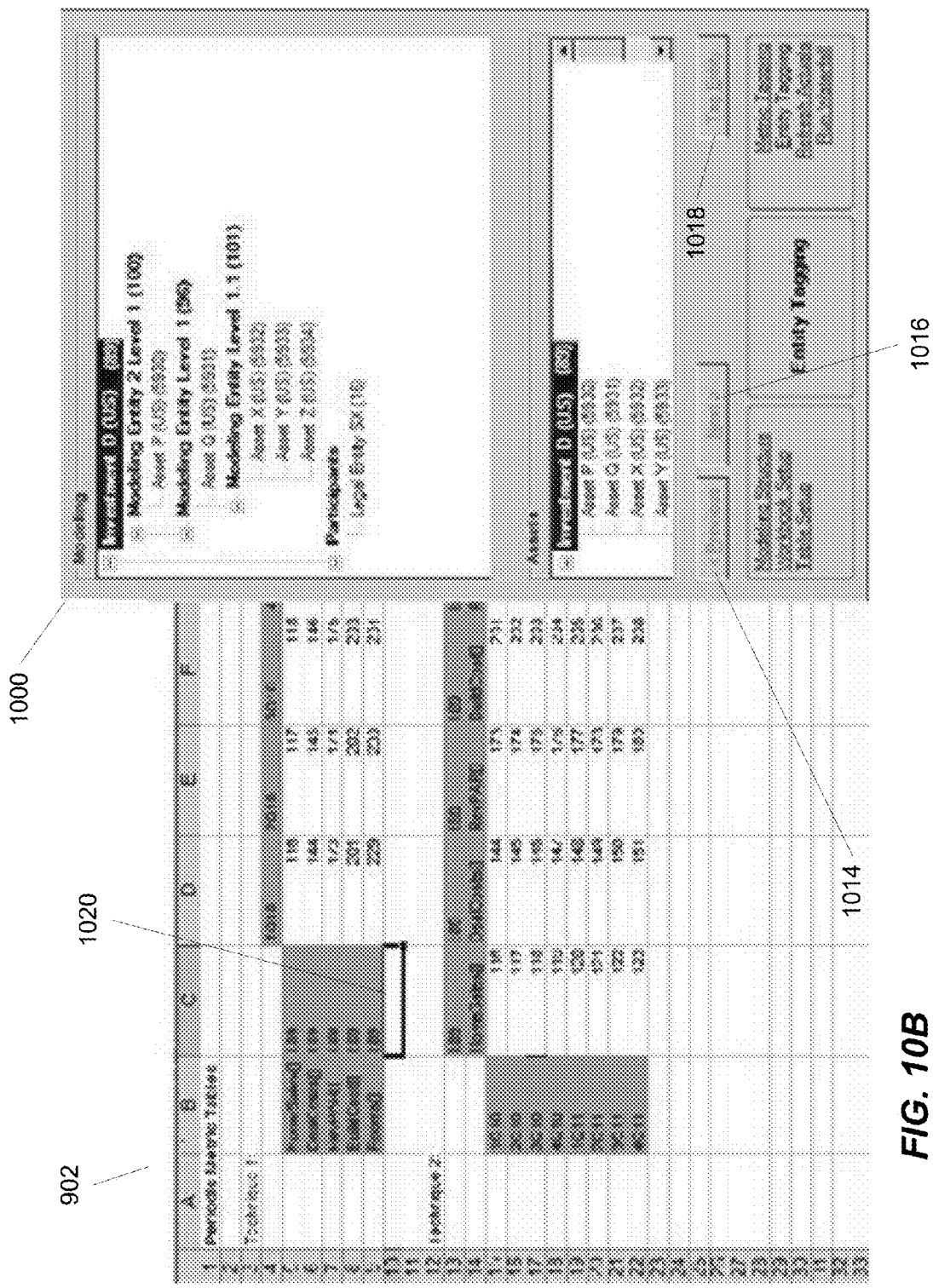

FIG. 10A and FIG. 10B illustrate an example interface 1000 that would be presented by the plug-in and used to tag the entity dimension in the portion 902.

The shaded cells 1004 in the column indicates a sample named entity range within which tags for one or more entities can be placed, or viewed, within the interface 1000. As shown, a cell 1006 within this range has been selected and an action has been taken which brings up the interface 1000. Depending upon the particular implementation, the interface 1000 can be configured to automatically "pop up" when a particular action has been taken, for example selecting a cell and hovering over it for a specified period of time with the cursor, selecting an entry or icon of a menu or toolbar, or through some other specified action. The entity 1008 represented within the cell is shown highlighted in the upper window 1010 of the interface 1000.

At this point it is worthwhile noting that, as used herein and as shown in the interface of FIG. 10A and FIG. 10B, the "entity", in this case entity "89" is an asset model, for example, for a real estate model, a single-family property at a specific address, or an entity comprised of other entities, for example, an apartment building that, itself is made up of other entities, namely the individual units of the apartment building or a mall complex having multiple individual leased spaces, a series of apartment buildings in different locations, or even combinations of various assets. In the case of, for example a model for a non-real estate property investment portfolio, an entity could be an individual equity, stock, bond or commodity holding for example, or it could be a more complex arrangement, for example a fund comprising one or more other entities. In other words, an entity could be a simple, single "thing" or it could be a group of things that have peer, a hierarchical or some combination of peer and hierarchically related other entities, the number of peers or levels of hierarchy allowed being a function of the particular implementation.

As shown in FIG. 10A, the selected entity tag "I:89" corresponds to "Investment D" 1008. Note that, as shown, the entity number "89" from the tag, appears within the window 1010 in parenthesis following the entity name. This will be the case, in this implementation, for any defined entity within the system. As shown, on a peer level, "Investment D" has associated with it "Participants" made up of an entity labeled "Legal Entity SX" that itself is entity "16" in this example system. "Investment D" is, itself made up of multiple peer entities, "Modeling Entity" and "Modeling Entity 2" which are, respectively, entities "96" and "100." "Modeling Entity 2" is made up of a single entity, "Asset P" which, as shown, is a US-based asset and itself is entity "5930." Similarly, "Modeling Entity" is hierarchically made up of four entities. At the highest level, it includes a single asset, "Asset Q," which itself is entity "5931." One level down in the hierarchy, at "Level 1.1" it includes three peer assets, each also individually being entities entity numbers as indicated by the numbers within the parentheses: "Asset X (5932)," "Asset Y (5933)," and "Asset Z (5934)." As should now be understood, there is virtually no conceptual limit to the number and type of hierarchical relationships that can be configured among assets. As shown however, for purposes of example, there is a limit in that with the example implementation shown, an asset must always and only be at the leaf level. Note also that the lower window 1012 shows all of the assets that are part of "Investment D" without regard to their level or sub-level in the hierarchy shown in the upper window 1010.

As with the metric tagging interface 900, the entity tagging interface 1000 also can include navigation 1014, 1016 as well as a "Tag Entity" 1018 button which allows the user to place a tag for an entity in the selected cell of the spreadsheet file within a defined entity range.

FIG. 10B, like FIG. 9B, illustrates how the ability to navigate 1014, 1016 among cells or tag a cell 1018 is disabled when the user selects a cell 1020 outside a range defined in the rule for entity tags.

Note that, depending upon the particular implementation, if a given tagged cell contains a formula (I.e. a value calculated as a function of one or more other cells), the actual calculated result value can be what is extracted in some implementations, whereas in others, some variant of the formula can be extracted (for example, if all of the cells on which the function relies are extracted, a new representation of the formula can be created). How such formulas are handled in a particular implementation can advantageously be decided by the implementer based upon the particular model, needs and/or preference.

Figure 11:
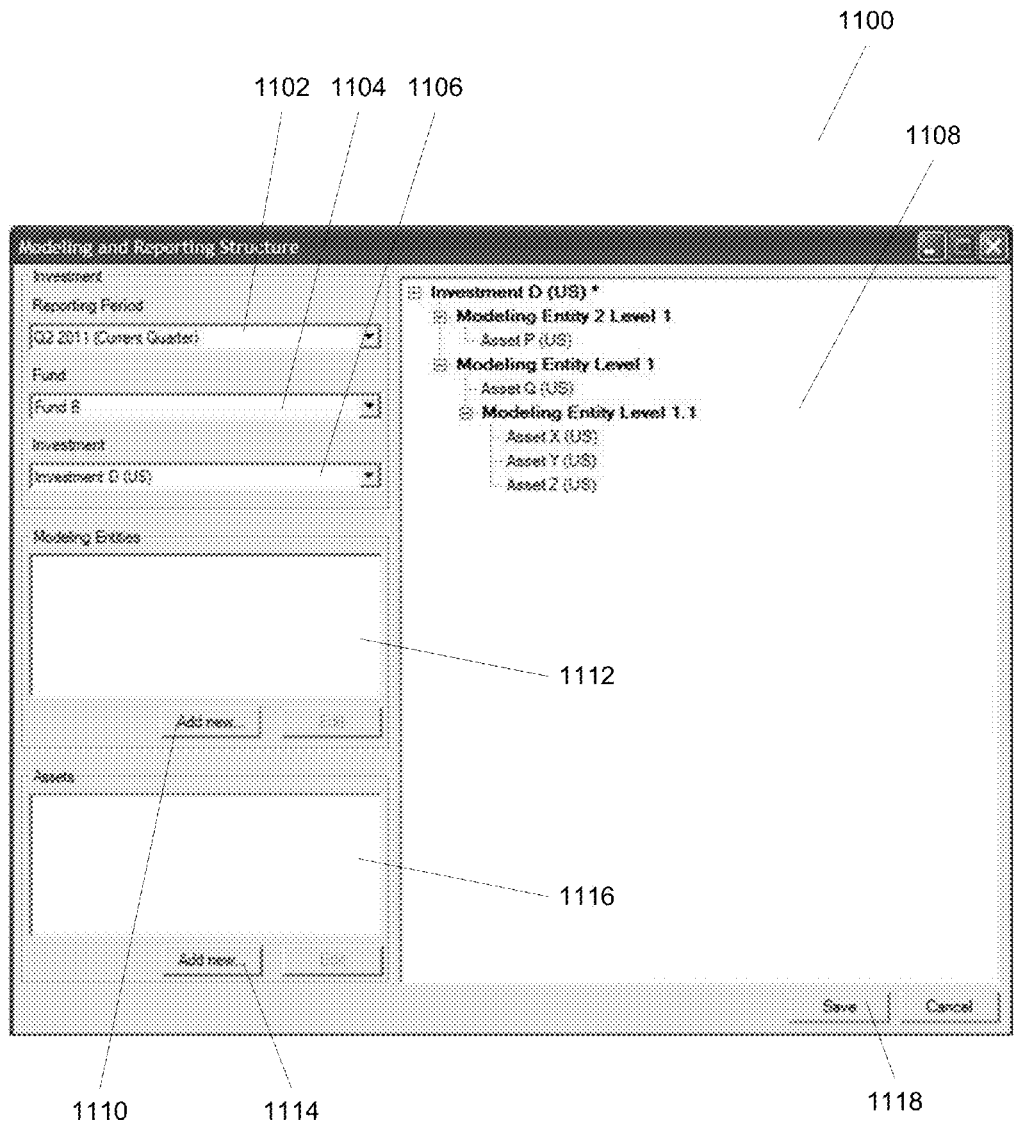
FIG. 11 illustrates, in simplified form, an interface used for creating an entity modeling hierarchy.

FIG. 11 illustrates, in simplified form, an interface 1100 used for creating an entity hierarchy (i.e. creating an entity model). As should now be understood, the entity can be modeled either by itself or in conjunction with some other entities. For purposes of illustration, the interface 1100 depicts the formation of "Investment D" previously-discussed in connection with FIG. 10A. As shown, the interface 1100 includes various entity characteristics 1102, 1104, 1106 (examples of which have already been selected) that can be used as filters. For example, this interface 1100 includes filters for the "Reporting Period" 1102, in this example case "Q2 2011", the "Fund" 1104 in this case "Fund B", and the "Investment" 1106, which in this case is "Investment D," the highest level of the modeled entity. The contents of the modeled "Investment D" is shown in the hierarchy portion 1108 of the interface 1100 because it has already been created. If one wished to add to this investment in the model, one could create a new modeling entity by selecting a part of the hierarchy to which the new entity will be a child followed by the "Add new" 1110 button on the "Modeling Entities" 1112 portion of the interface 1100. A new modeling entity level will then be added. Similarly, if additional assets are to be added to a modeling entity in the hierarchy at any location, the location under which the asset would be added would be selected followed by the "Add new" 1114 button under the "Assets" 1116 portion of the interface. This would cause a list of assets to appear in the "Assets" 1116 portion of the interface 1100 (subject to the filters) which would then be added when selected.

Alternatively, the interface 1100 could be constructed with "drag and drop" capability so that at least assets could be dragged into and/or out of the hierarchy portion 1108. As shown the interface 1100 includes such "drag and drop" capability. As a result, the various entities can be added or removed from the hierarchy by dragging an investment, or component thereof, to or from a position in the hierarchy, provided however in this implementation, the root node is an investment and any such assets are leaf nodes.

Similarly, the interface can be set up so that, upon selection of one or more of a specific "Reporting Period", "Fund" or "Investment" in the filters 1102, 1104, 1106 all entities in the system which satisfy the specified filter(s) will be populated in the appropriate respective portions 1112, 1116 for selection. The user could then have the option of selecting one or more child entities from those portions 1112, 1116 to thereby build a modeling structure in a peer, multilevel hierarchy or some combination thereof. Note that, as contemplated, the contents of the "Assets" portion 1116 will generally reflect the lowest level entities available, so they could not, themselves have child entities beneath them.

Once a user is happy with the modeling structure that they have created, selecting "Save" 1118 will cause the system to assign a unique identifier, in this example an entity number, to the root of the modeling structure and to persist the modeling structure to the appropriate data storage for the system.

Optionally, the system can also include the ability to consider the effect of various "what if" scenarios appropriate for the particular implementation through, for example, the imposition or addition of various factors or assumptions to a segment of the model or globally.

Figure 12:
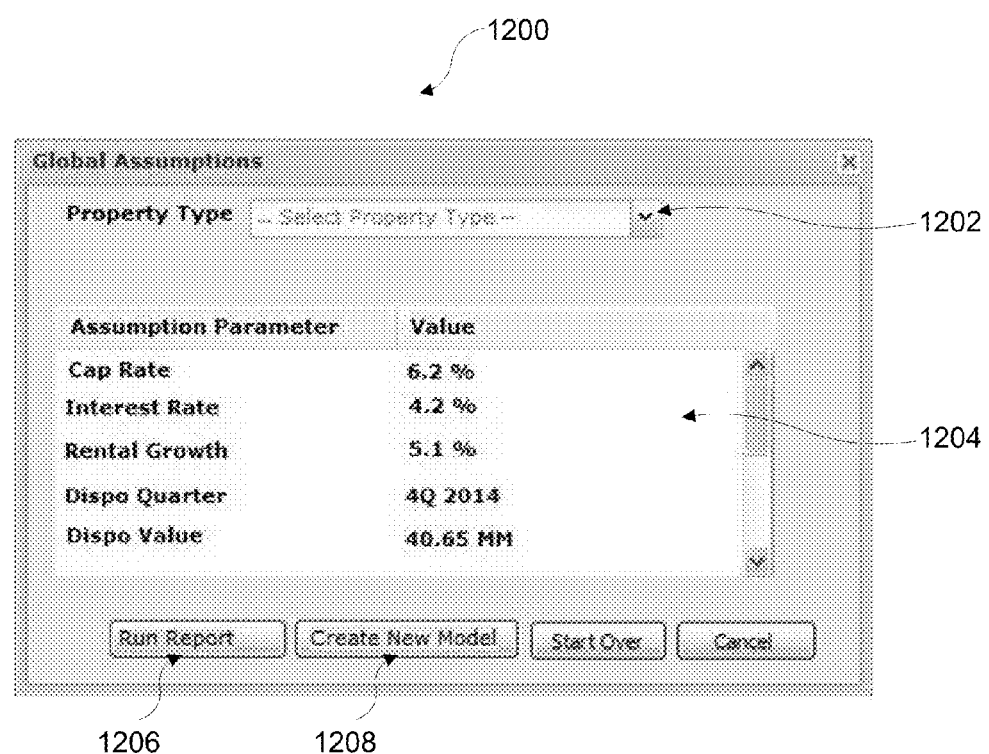
FIG. 12 illustrates a representative, illustrative example of an interface that can be used to enter or change assumptions in connection with generating "what if" scenarios.

FIG. 12 illustrates a representative, illustrative example of an interface 1200 that can be presented to a user and thereby used to consider "what if" scenarios. As shown in FIG. 12, the interface 1200 is configured to allow one to impose or modify a set of global assumptions and generate a report reflecting the assumption(s) or change. This interface can thus be used to effect a change to certain numbers applicable to the model and force a recalculation within all system comprehensible spreadsheet-based models within the designated "scenario" (described below) using the calc workflow in a way that would not change the values in the spreadsheet-based business model itself. The idea behind this optional enhancement is to allow the user to analyze how the models would vary with a change in any available assumption parameter(s). A further optional enhancement can be constructed to allow the user to select a particular reporting period, parent entit(y)/(ies) and/or geographical boundaries and run their "what if: scenario in a model that only affects the concerned period, entit(y)/(ies) or geography.

In the example interface 1200 of FIG. 12, the user can choose a specific property type 1202 (for example, Office or Hotel) and, by doing so, the modifiable assumption parameters in effect, if any, are displayed in a window 1204 and can be modified by the user. Depending upon the particular implementation and selection, a change can be configured to allow absolute and/or relative modifications. A change would be absolute if it represents a single value as is understood by the concerned parameter (i.e. changing the interest rate from "4.2%" to "5.7%"). A relative change would depict an upward or downward shift along with the change in value (i.e. an initial value of "4.2%" and a change of "+1.5%").

By selecting "Run Report" 1206, the suggested changes in the assumption parameters are applied to the various models which have been created within the chosen reporting period and which pertain to the concerned entities (in this example filtered further by the chosen property type) and a report is generated which illustrates the model data along with recalculated values based on changes in the assumption parameters.

Optionally, the interface can include the ability to create a new set of models in lieu of the existing ones filtered in the same fashion as described above, for example by selecting a "Create New Model" button 1208. Implementations can further be optionally configured such that a new model (as well as a "what if" result) can be persisted in the system in a way that does not change the current model but incorporates the changes in the assumption parameters as if they were the actual values. In this manner, "what if" scenarios can be iteratively changed or reconsidered as time or events require or suggest.

Figure 13:
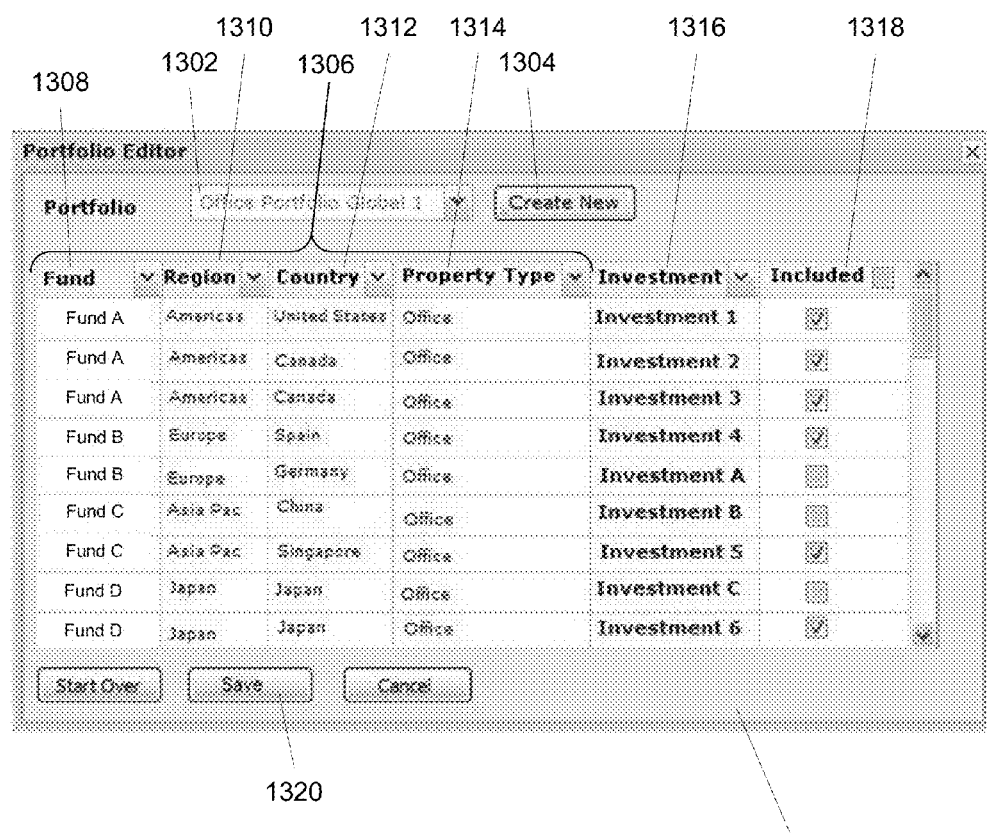
FIG. 13 is a representative, illustrative example of an interface, which permits the user to create a new or edit an existing portfolio for purposes of generating "what if" scenarios.

FIG. 13 is a representative, illustrative example of an interface 1300 that can be displayed to a user and which permits the user to create a new or edit an existing portfolio for purposes of modeling. A portfolio is a basket of specified entities in the system. In general, entities would be pooled into a portfolio when there will be a need to group them together for data aggregation purposes.

The interface 1300 provides the user with the ability to select an existing portfolio 1302 or select a button 1304 to specify a unique name for a new portfolio. A portion 1306 of the interface is configured with filters, in the example interface 1300, filters for "Fund" 1308, "Region" 1310, "Country" 1312 and/or "Property Type" 1314 which, when selected brings up in another column 1316 all root level (i.e. ultimate parent) entities that satisfy the selected filters.

The final column 1318 of the example interface 1300 allows the user the user to select one or more of the displayed entities in the preceding column 1316 to select from among the displayed entities and thereby make the selected entities part of the named portfolio. When the selection is compete, selecting "Save" 1320 causes the changes made to be persisted to the appropriate data storage.

Figure 14:
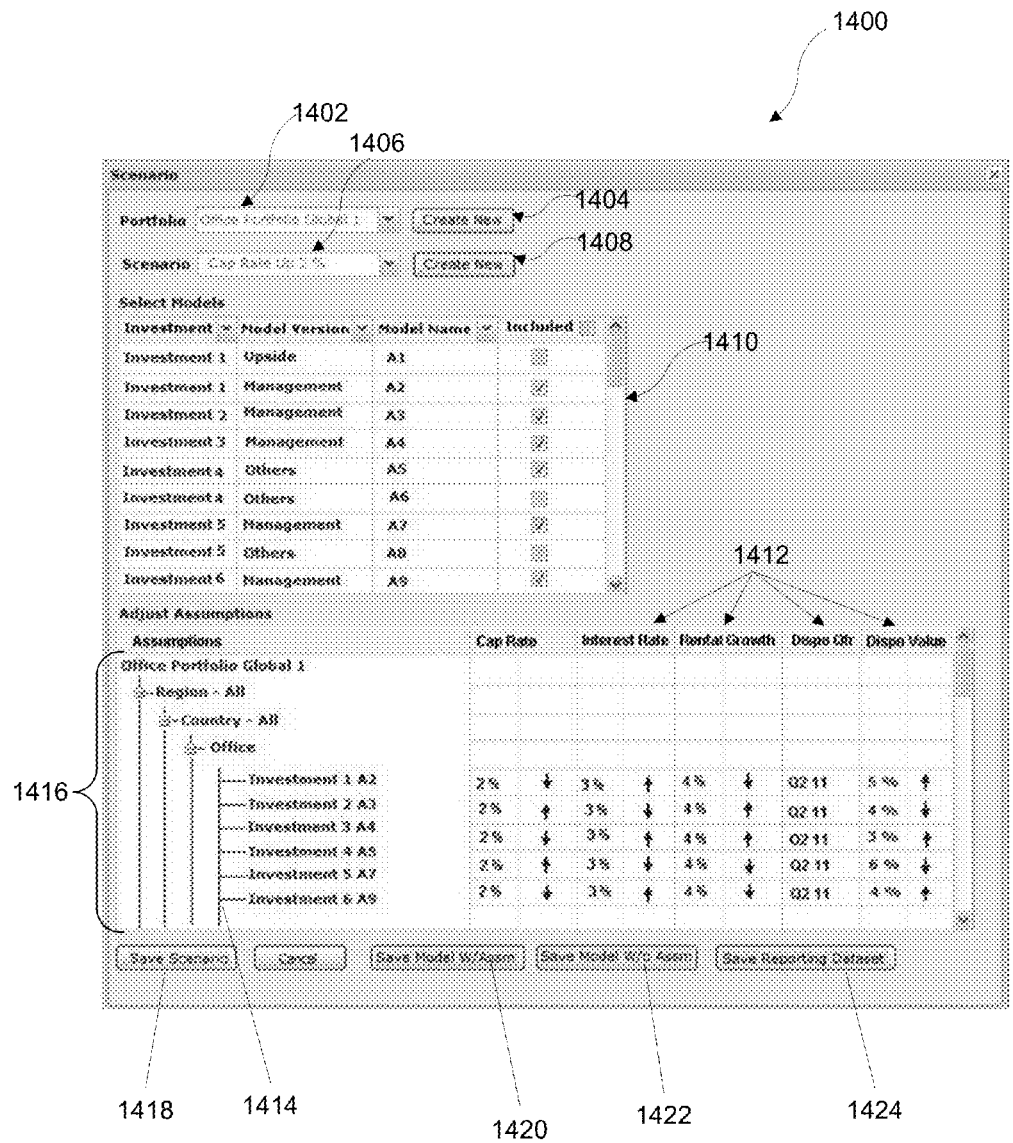
FIG. 14 depicts an alternative or additional interface that permits a user to create a scenario for a set of entities.

FIG. 14 depicts an alternative or additional interface 1400 that can be presented to a user to permit the user to create a "scenario" for a set of entities. As referred to herein, a "scenario" is a set of choices grouped together and applied to a particular portfolio of entities, in other words, a basis for a more comprehensive "what if" analysis.

In operation, the interface 1400 allows the user to choose an existing portfolio 1402 or create a new one 1404. In this example, selection of "Create New" would bring up the portfolio-related interface 1300. Similarly, the "Scenario" pull down menu 1406 allows the user to select the name of an existing scenario and update it, while selecting "Create New" 1408 would require the user to type in a unique name for the new scenario and then proceed to create it within this interface.

As shown in FIG. 14, a "Select Models" portion 1410 of the interface 1400 depicts all entities that are already a part of the specified portfolio 1402. All models that are part of that portfolio along with their various versions appear beside these entities. The user then has the choice of including one or more specific models, or all models, in the particular scenario represented by and/or created with this interface 1400. Any model selected within the "Select Models" portion 1410 automatically becomes a part of the collection 1414 reflected in the "Assumptions" portion 1416 of the interface 1400 and, if deselected, is removed from the displayed collection.

The user can then change values for any of the various assumptions 1412 for the models displayed in the portion 1416 and which thereby constitute the scenario. Note here too that, depending upon the particular implementation, the change in value can be allowed to be absolute and/or relative.

Once the user has completed their scenario, selecting "Save Scenario" 1418 causes a save of the metadata for this scenario to the network data storage. Selecting the optional "Save Model W/Assm" 1420 allows the user to apply these "Assumptions" to the models for this scenario, in which case they are pushed into the workflow queues as described above for reprocessing and the resultant new values for the tagged data resulting from the reprocessing (along with the associated tags) is persisted to the network data storage. Selecting the optional "Save Model W/o Assm" 1422 will create a new model as a replica of the existing one with none of the changes in the assumption parameters applied and no recalculation. The new model will then be pushed into the workflow queues and its tagged data (along with the associated tags) will be persisted to the network data storage in "as is" condition. Selecting the optional "Save Reporting Dataset" 1424 allows the user to directly view the results of all changes, for example, changes in the reporting space, changes that are affected by an update in the global assumption parameters, changes that are material enough to cause a recalculation of cash flows within the selected models, etc. Specifically, selecting "Save Reporting Dataset" 1424 button causes the system to open each of the spreadsheet files underlying each model by sending a request to the appropriate spreadsheet engine 114, which then finds the relevant tags pertaining to the assumption parameters, applies the revisions to the affected tags and/or values, and forces a recalculation within the spreadsheet program 106. Thereafter, it extracts those values which are of reporting interest to the user, saves them into a reporting space and then closes each opened spreadsheet file without saving any of the changes, thereby leaving the original file untouched. The user can then view the reports with the revised numbers without having actually updated any values in the models (i.e. they retain the values that were present when opened).

Figure 15:
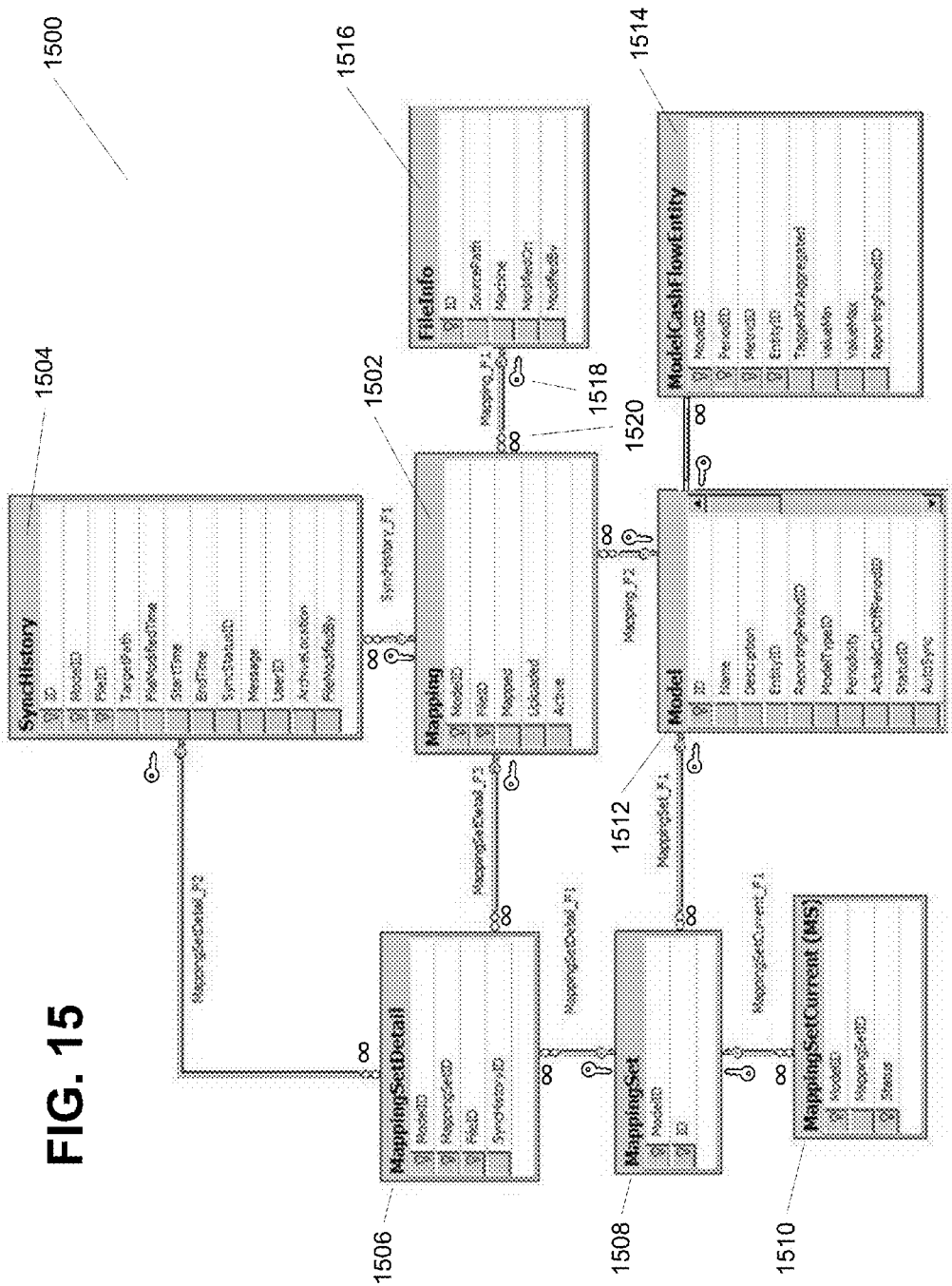
FIG. 15 is an example entity relationship diagram (ERD) for an illustrative example database as described herein.—

FIG. 15 is an example entity relationship diagram (ERD) 1500 for an illustrative example database 126 implementation for use with example real estate based business models such as described above.

As shown, the ERD includes eight tables as specified below:

The "Mapping" Table 1502 includes columns for: ModelID (key), FileID (key), Mapped, Uploaded and Active.

The "SyncHistory" table 1504 includes columns for: ID (key), ModelID (key), FileID (key), TargetPath, FileModifiedTime, StartTime, EndTime, SyncStatusID, Message, UserID, ArchiveLocation and FileModifiedBy.

The "MappingSetDetail" table 1506 includes columns for: ModelID (key), MappingSetID (key), FileID (key) and SyncHistoryID.

The "MappingSet" table 1508 includes columns for: ModelID (key) and ID (key).

The "MappingSetCurrent" table 1510 includes columns for: ModelID (key), MappingSetID and Status (key).

The "Model" table 1512 includes columns for: ID (key), Name, Description, EntityID, ReportingPeriodID, ModelTypeID, Periodicity, ActualsCutOffPeriodID, StatusID and Auto Sync.

The "ModelCashFlowEntity" 1514 table includes columns for: ModelID (key), PeriodID (key), MetricID (key), EntityID (key), TaggedOrAggregated, ValueMin, ValueMax and ReportingPeriodID.

The "FileInfo" table 1516 includes columns for: ID (key), SourcePath, Machine, ModifiedOn and ModifiedBy.

As noted above, "mapping" is the way of indicating to the system that one or more identified files constitute a model for modeling purposes, and should be regarded as one composite entity from the standpoint of that model. The mapping as well as the sync and calc workflow processes will be discussed from an internal system perspective with reference to the example ERD of FIG. 15.

Since the meaning and reading of ERDs, such as shown in FIG. 15, as well as their use in creation of SQL code for database construction is well known, only a brief explanation of the specific notations used in FIG. 15 will be provided to ensure a proper understanding in the event that the reader is unfamiliar with that specific notational scheme, which correspond to the notation used in the Microsoft® SQL Server Management Studio for accessing a SQL Server database using Microsoft® SQL Server™ 2005.

Specifically, for the entity-relationship between two of the tables shown in FIG. 15, the "Mapping" table 1502 and the "FileInfo" table 1516, the key symbol 1518 on the right and the infinity 1520 on the left indicates that a referential integrity constraint exists between the two tables 1502, 1516 in a one to many relationship. Thus, the primary key in the FileInfo table 1516 (the one to which the key symbol on the right points), i.e. the ID column, exists as the foreign key in the "Mapping" table 1502 in the column with the name FileID. In other words, every record in the "Mapping" table 1502 must have a FileID that exists or identifies an existing record in the FileInfo table 1516.

Table 1 below identifies the relationship among the various tables of FIG. 15.

TABLE 1

| Primary Table | Foreign Key Table | Relationship |
|---|---|---|
| FileInfo | Mapping | One to Many |
| Model | Mapping | One to Many |
| Model | ModelCashFlowEntity | One to Many |
| SyncHistory | MappingSetDetail | One to One |
| MappingSet | MappingSetDetail | One to Many |
| MappingSet | MappingSetCurrent | One to One |
| Model | MappingSet | One to Many |
| Mapping | SyncHistory | One to One |
| Mapping | MappingSetDetail | One to Many |

When a file is mapped, a single entry for each such file gets saved to the "FileInfo" table 1516 with its relevant information viz. the location of the file, machine name which indicates the file location in the case where an upload feature is available and used instead of mapping. Thereafter an entry is added to the "Model" table 1512 indicating the name of the business model, the root entity to which the model belongs, the reporting period in which the model has been created, etc. Next, an entry is added to the "Mapping" table 1502, which depicts a mapping between the newly added file(s) and the newly created model. As noted above, alternative implementations can provide for a direct upload of a validated model from the user's storage 112 to the network storage 116 via an "Upload" process Where this is the case, an entry would be added to the 'Uploaded' column.

Synchronization (i.e. the sync workflow) resets the connection between a particular spreadsheet-based business model file (or set of such files) hereinafter referred to as a "mapping set" and the network storage area.

When the user creates a model for the first time, the relevant entries are posted to the "FileInfo" 1516, "Model" 1512 and "Mapping" 1502 tables. After the first synchronization, a new sync history record for each file is inserted into the "SyncHistory" table 1504. When the file (or all files in the set) is/are synchronized, a mapping set is created in the "MappingSet" table 1508 to indicate that the model is now synchronized in the database. The "MappingSetDetail" table 1506 includes more detailed information for the mapping set reflected in the parent table on a per file basis along with the SyncHistoryID specifying that the sync operation that was completed on that file. Thus, while the "MappingSet" table 1508 reflects one or more mapping sets for the model as a whole, the "MappingSetDetail" table 1506 additionally includes, for each such mapping set, the file information pointing to the model.

Each time a sync request is performed on the model, a new mapping set is created in the "MappingSet" table 1508. This can result in multiple entries appearing in this table for a particular model. Hence information about the "current" mapping set is maintained in the "MappingSetCurrent" table 1510. The "current" status is reflected in the Status column in this table 1510 and can hold two values viz. "Latest" and "Validated." Due to the way referential integrity is set on this table, this means that any model can exist once with "Validated" status or twice, once with "Latest" status and again with "Validated" status.

When the data validation, extraction, aggregation and persistence steps are completed, the data would be saved into the "ModelCashFlowEntity" table 1514. The "cashflow" values are saved into the ValueMin and ValueMax columns (to permit saving a range of values where applicable) while the TaggedOrAggregated column reflects whether the values thus saved resulted from aggregation or direct input from the user.

It should be understood that the foregoing description (including the figures) is only representative of some illustrative embodiments. For the convenience of the reader, the above description has focused on a representative sample of all possible embodiments, a sample that teaches the principles of the invention. The description has not attempted to exhaustively enumerate all possible variations. That alternate embodiments may not have been presented for a specific portion of the invention, or that further undescribed alternate embodiments may be available for a portion, is not to be considered a disclaimer of those alternate embodiments. One of ordinary skill will appreciate that many of those undescribed embodiments incorporate the same principles of the invention as claimed and others are equivalent.

What is claimed is:

1. A computer-implemented method of shared business modeling involving spreadsheet-based business models in a network of computers, the method comprising:

maintaining a set of tags in at least one storage device in the network, at least some of the tags in the set comprising metric dimension tags and others of the tags in the set comprising entity dimension tags, the metric dimension tags and entity dimension tags being assignable by a user to data entries in a user's spreadsheet to create rules associating data in cells of the spreadsheet each with at least one metric dimension tag and one entity dimension tag;

receiving, from the user, a specific association of a particular spreadsheet with an entity within the network having an entity identifier, the particular spreadsheet including at least one rule comprising at least one uniquely named table associating data values from among specific cells within the particular spreadsheet such that the specific cells will each be tagged with at least both a specific entity dimension tag and a specific metric dimension tag;

extracting, using a computer in the network, spreadsheet data values from the tagged cells and their associated metric dimension tags and entity dimension tags from the spreadsheet; and storing each of the extracted spreadsheet data values in combination with their respective metric dimension tag and entity dimension tag, in a shared network-accessible storage.

2. The method of claim 1, further comprising:
receiving an indication that a tagged data value in the spreadsheet has been altered such that it is a changed data value; and
transferring the changed data value from the spreadsheet to the shared network-accessible storage containing the spreadsheet data values and replacing the tagged data value with the changed data value in the shared network-accessible storage using a computer-based sync engine.

3. The method of claim 1, wherein the spreadsheet data values stored in the shared network-accessible storage have associated therewith, a timestamp indicating when the spreadsheet data values were stored in the shared network-accessible storage, the method further comprising:
when a data change in the spreadsheet occurs, resulting in new values, and the storing is initiated, and the shared network-accessible storage already contains the spreadsheet data values, comparing the timestamp for the spreadsheet data values with a new value associated timestamp.

4. The method of claim 1, further comprising:
validating a tagging of the spreadsheet data values with proper dimension tags as part of, or prior to the storing.

5. The method of claim 1, further comprising:
displaying a graphical interface to the user to facilitate creation of the rule.

6. The method of claim 1, further comprising:
denoting a specific dimension is applicable to one or more data-containing cells by displaying a pre-specified dimension label in a row or a column of the particular spreadsheet that contains the data value to which the specific dimension applies.

7. The method of claim 6, wherein the denoting comprises applying a background color to a dimension-label-containing cell.

8. The method of claim 1, further comprising:
in response to a report request, accessing the shared network-accessible storage and retrieving stored values extracted from at least two different tagged spreadsheets;
aggregating at least two of the retrieved values to obtain a combined value; and
generating a report containing the combined value.

9. The computer-implemented method of claim 1 further comprising: generating a report from at least two spreadsheet-based business models by
(a) receiving a selection, via a computer interface, of a first asset having a first system comprehensible spreadsheet-based business model associated therewith and a second asset having a second system comprehensible spreadsheet-based business model associated therewith for inclusion in a scenario involving at least one of the first system comprehensible spreadsheet-based business model or the second system comprehensible spreadsheet-based business model;
(b) receiving a selection, at a server, of at least one assumption to be applied to the scenario;
(c) initiating a calc workflow operation, the calc workflow operation including accessing tagged data from storage accessible by the server, applying the at least one assumption to at least one item of tagged data; and
(d) generating a report using the tagged data incorporating application of the at least one assumption.

10. The computerized method of claim 9, wherein the calc workflow operation further comprises:
accessing the at least one of the first or second system comprehensible spreadsheet-based business models,
injecting a new value, resulting from the applying of the at least one assumption, into the one of the first or second system comprehensible spreadsheet-based business models, in place of a tagged data value so as to cause the spreadsheet to recalculate any values dependent upon the new value,
extracting a recalculated value from a tagged cell for use as an item of tagged data when generating the report; and
closing the one of the first or second system comprehensible spreadsheet-based business models without saving the new value or the recalculated value therein.

11. A computer-implemented method of converting a local business model in a spreadsheet into a network-based business model comprising:
opening the spreadsheet on a computer of a network;
associating the spreadsheet with an entity on the network, the entity having an entity identifier that can be used to tag at least one data containing cell of a spreadsheet to that entity, the associating with the entity thereby limiting tags which can be used to tag data within the spreadsheet;
using a computer-based tagging engine, creating a rule for at least one cell of the spreadsheet, the rule comprising an association of both entity dimension and metric dimension tags with data contents of the at least one data containing cell;
mapping the spreadsheet onto the network; and
initiating a workflow operation for the spreadsheet which will cause a computer on the network to extract and save information from the spreadsheet on shared network storage based upon dimension tags within the spreadsheet such that, (a) if the contents of the cell is a number, the number and the at least two dimensions associated with the cell will be stored on the shared network storage, and (b) if the contents of the cell is an expression, a result of evaluating the expression, will be stored on the shared network storage along with the at least two dimensions associated with the cell.

12. The method of claim 11, wherein the creating the rule further comprises:
including a period dimension in the rule.

13. A computer apparatus, comprising:
computer network shared data storage;
multiple computers coupled to the computer network shared data storage;
a spreadsheet application on at least one of the multiple computers, through which a user can implement a business data model and maintain the business data model in the computer network shared data storage;
a computer-based tagging engine which provides a user accessible interface through which a user establishes rules for data of the business data model by tagging, thereby associating data in at least one cell of a spreadsheet implementing the business data model with a row and column intersection of at least both an entity dimension tag and a metric dimension tag;
a computer based sync engine which ensures that data contents of the business data model stored in the computer network shared data storage reflect a current value for the at least one cell; and
a computer based calc engine which can receive output from the tagging engine and performs period aggregation and entity aggregation for the data model before storing data of the business data model in the computer network shared data storage.

14. The computer apparatus of claim 13, wherein the computer based calc engine implements currency conversion calculations when contents of the business data model are expressed in a local currency instead of a target currency.

15. The computer apparatus of claim 13, wherein the calc engine is configured to extract data values from the spreadsheet at each cell location corresponding to a location of intersection between a dimension tagged to a column of the spreadsheet and a dimension tagged to a row of the spreadsheet.

16. The computer apparatus of claim 15, wherein the location of intersection is to the right of row-assigned dimension tags and beneath column-assigned dimension tags.

17. The computer apparatus of claim 15, wherein the location of intersection is to the left of row-assigned dimension tags and above column-assigned dimension tags.

18. The computer apparatus of claim 15, wherein the location of intersection is to the right of row-assigned dimension tags and above column-assigned dimension tags.

19. The computer apparatus of claim 15, wherein the location of intersection is to the left of row-assigned dimension tags and beneath column-assigned dimension tags.

* * * * *